United States Patent
Walker et al.

(10) Patent No.: US 9,734,583 B2
(45) Date of Patent: Aug. 15, 2017

(54) SYSTEMS AND METHODS FOR CONTROLLING VEHICLE POSITION AND ORIENTATION

(71) Applicants: Collin Walker, Phoenix, AZ (US); Gary Walker, Phoenix, AZ (US)

(72) Inventors: Collin Walker, Phoenix, AZ (US); Gary Walker, Phoenix, AZ (US)

( * ) Notice: Subject to any disclaimer, the term of this patent is extended or adjusted under 35 U.S.C. 154(b) by 0 days.

(21) Appl. No.: 14/788,239

(22) Filed: Jun. 30, 2015

(65) Prior Publication Data
US 2015/0378361 A1 Dec. 31, 2015

Related U.S. Application Data

(60) Provisional application No. 62/019,338, filed on Jun. 30, 2014.

(51) Int. Cl.
*G06T 7/00* (2017.01)
*G05D 1/02* (2006.01)
(Continued)

(52) U.S. Cl.
CPC ......... *G06T 7/0089* (2013.01); *G05D 1/0206* (2013.01); *G06T 7/10* (2017.01);
(Continued)

(58) Field of Classification Search
CPC ...... G05D 1/0206; G05D 3/00; G05D 1/0088; G05D 1/0875; G05D 1/048; G05D 3/12;
(Continued)

(56) References Cited

U.S. PATENT DOCUMENTS 3,135,952 A * 6/1964 Bretherton ............ B63B 35/816
340/985
4,939,661 A * 7/1990 Barker ................... G01C 21/22
342/452
(Continued)

OTHER PUBLICATIONS

Umeyama, Shinji, Least-Squares Estimation of Transformation Parameters Between Two Point Patterns, IEEE Transactions of Pattern Analysis and Machine Intelligence, vol. 13, No. 4, Apr. 1991, 5 pages.
(Continued)

*Primary Examiner* — Behrang Badii
*Assistant Examiner* — Daniel L Greene
(74) *Attorney, Agent, or Firm* — TraskBritt

(57) ABSTRACT

Systems and related methods for controlling vehicle position and movement are disclosed. A system includes one or more computers configured to receive data corresponding to video image frames of at least a portion of a course, and analyze the video image frame to estimate at least one of position and orientation of the vehicle within the course. A method includes identifying groups of pixels from the video image frames that are determined to correspond to non-background objects in the course. The method also includes correlating at least a portion of the identified groups of pixels with known objects in the course, and analyzing positions of the groups of pixels within the video image frames and known positions of at least one of an image capture device and known objects relative to the course to estimate at least one of the position and orientation of the vehicle within the course.

20 Claims, 6 Drawing Sheets

(51) Int. Cl.
*G06T 7/73* (2017.01)
*G06T 7/10* (2017.01)
*G06T 7/194* (2017.01)

(52) U.S. Cl.
CPC .............. *G06T 7/194* (2017.01); *G06T 7/75* (2017.01); *G06T 2207/10021* (2013.01); *G06T 2207/10028* (2013.01); *G06T 2207/30244* (2013.01); *G06T 2207/30252* (2013.01); *G06T 2207/30261* (2013.01)

(58) Field of Classification Search
CPC ..... G06T 7/0089; G06T 7/0026; G06T 7/004; G06T 7/0097
See application file for complete search history.

(56) References Cited

U.S. PATENT DOCUMENTS

| | | | | |
|---|---|---|---|---|
| 5,142,473 | A * | 8/1992 | Davis | B63B 39/14 440/1 |
| 5,190,256 | A * | 3/1993 | Macchiarella | B63B 35/816 114/253 |
| 5,276,660 | A * | 1/1994 | Lee | G07C 1/22 368/10 |
| 5,884,213 | A * | 3/1999 | Carlson | G05D 1/0206 114/144 A |
| 6,273,771 | B1 * | 8/2001 | Buckley | B63H 21/213 114/144 RE |
| 6,312,301 | B1 * | 11/2001 | Kennedy | A63B 69/187 114/253 |
| 6,456,910 | B1 * | 9/2002 | Roe | G05D 1/0206 701/23 |
| 7,031,224 | B2 * | 4/2006 | Reifer | A63B 24/0021 367/118 |
| 7,354,321 | B2 * | 4/2008 | Takada | B63H 5/125 114/144 RE |
| 7,494,393 | B2 * | 2/2009 | Walser | B63B 49/00 440/1 |
| 7,494,394 | B2 * | 2/2009 | Walser | B63B 49/00 440/1 |
| 7,835,221 | B2 * | 11/2010 | Vigen | G01V 1/3835 367/19 |
| 8,677,920 | B1 * | 3/2014 | Jeng | B63B 3/08 114/312 |
| 9,207,675 | B1 * | 12/2015 | Walser | G05D 1/0206 |
| 2004/0056779 | A1 * | 3/2004 | Rast | B63B 22/16 340/985 |
| 2008/0008031 | A1 * | 1/2008 | Vigen | G01V 1/3835 367/15 |

OTHER PUBLICATIONS

Walker, Collin, A Real-Time Vision System for Semo-Autonomous Surface Vehicle, Arizona State University, Aug. 2014, 188 pages.
Walther et al., Detection and Tracking of Objects in Underwater Video, California Institute of Technology, 2004, 6 pages.
Wang et al., Runway Detection and Tracking for Unmanned Aerial Vehicle Based on an Improved Canny Edge Detection Algorithm, 2012 4th International Conference on Intelligent Human—Machine Systems and Cybernetics, 2012 IEEE, 4 pages.
Wang, Yuxiang—An efficient algorithm for UAV indoor pose estimation using vanishing geometry, Department of Electrical and Computer Engineering, National University of Singapore, Jun. 13-15, 2011, 4 pages.
Wei et at., Motion Projection for Floating Object Detection, Dept. of Electrical and Computer Eng., Brigham Young University, Part II, LNCS 4842, pp. 152-161, 2007.
Winnemoller et al., XDoG: An eXtended difference-fo-Gaussians compendium including advanced image stylization, Adobe Systems, Inc., Oct. 2012, 15 pages.
Wren et al., Pfinder: Real-Time Tracking of the Human Body, M.I.T. Media Laboratory Perceptual Computing Section Technical Report No. 353, IEEE Transactions on Pattern Analysis Machine Intelligence, Jul. 1997, vol. 19, No. 7, pp. 780-785.
Xinhua et al., Research on the application of vision-based autonomous navigation to the landing of the UAV, Nanjing University of Aeronautics and Astronautics, SPIE vol. 5253, 2003, 4 pages.
Yilmaz et al., Object Tracking: A Survey, University of Central Florida, Dec. 2006, 45 pages.
Ying et al., Camera Pose Determination From a Single View of Parallel Lines, National Laboratory on Machine Perception, Perking University, Sep. 2005, 4 pages.
Zhi et al., A Complete Linear 4-oint Algorithm for Camera Pose Determination, MM Research Preprints, vol. 21, Dec. 2002, pp. 239-249.
Zivkovic, Zoran, Improved Adaptive Gaussian Mixture Model for Background Subtraction, Intelligent and Autonomous Systems Group, University of Amsterdam, 2004, 4 pages.
Zivkovic et al., Efficient adaptive density estimation per image pixel for the task of background subtraction, Science Direct, Pattern Recognition Letters, Jul. 5, 2004, 8 pages.
Alvarez et al., Illuminant-Invariant Model-Based Road Segmentation, The Computer Vision Center, University Autonoma de Barcelona, 2008, 6 pages.
Amidi, Omead, Integrated Mobile Robot Control, The Robotics Institute, Carnegie Mellon University, May 1990, 39 pages.
Ansar et al., Linear Pose Estimation form Points or Lines, Jet Propulsion Laboratory, California Institute of Technology, 2002, pp. 282-296.
Arun et al., Least-Squares Fitting of Two 3-D Point Sets, IEEE Transaction on Pattern Analysis and Machine Intelligence, vol. PAMI-9, No. 5, Sep. 1987, 3 pages.
Baker, Kirk, Singular Value Decomposition Tutorial, Mar. 29, 2005, 24 pages.
Barnich et al., ViBe: A universal background subtraction algorithm for video sequences, IEEE Transactions on Image Processing, Jun. 2011, pp. 1709-1724.
Barnich et al., Vibe: A Powerful Random Technique to Estimate the Background in Video Sequences, University of Liege, Montefiore Institute, 2009, 4 pages.
Borghgraef et al., An Evaluation of Pixel-Based Methods for the Detection of Floating Objects on the Sea Surface, Hindawi Publishing Corporation, Eurasip Journal on Advances in Signal Processing, vol. 2010, Article ID 978451, Jan. 2010, 11 pages.
Cheung et al., Robust techniques for background subtraction in urban traffic video, Center of Applied Scientific Computing, Lawrence Livermore National Laboratory, 2004, 12 pages.
Corson, Robert, International Waterski & Wakeboard Federation-Tournament Water Ski Rules, IWWF Tournament Council, Jan. 29, 2013, 83 pages.
Dementhon et al., Model-Based Object Pose in 25 Lines of Code, Computer Vision Laboratory, Center for Automation Research, University of Maryland, May 28, 2005, 30 pages.
Dunbabin et al., An autonomous surface vehicle for water quality monitoring, Centre for Water Studies, School of Engineering, the University of Queensland, St. Lucia, Australia, Dec. 2009, 7 pages.
Fischler et al., Random Sample Consensus: A Paradigm for Model Fitting with Application to Image Analysis, Artificial Intelligence Center, Mar. 1980, 42 pages.
Hamilton et al., Perception-based Color Space for Illumination-invariant Image Processing, 35th annual conference on computer graphics and interactive techniques, 2008, 8 pages.
Hillel et al., Recent progress in road and lane detection: A survey, Machine and Vision and Application, Apr. 2014, 20 pages.
Horn et al., Closed-form solutions of absolute orientation using orthonormal matrix, Journal of the Optical Society of America A, vol. 5, p. 1127, Jul. 1988, 10 pages.
Huh et at., A Vision-Based Automatic Landing Method for Fixed-Wing UAVs, J. Intell Robot Syst. 2010, 15 pages.
Intille et al., M.I.T. Media Laboratory Perceptual Computing Section Technical Report No. 403, IEEE Conference on Computer Vision and Pattern Recognition, Nov. 1996, 8 pages.

(56) References Cited

OTHER PUBLICATIONS

Jodoin et al., Modeling Background Activity for Behavior Subtraction, Boston University, Electrical and Computer Eng., 2008, 10 pages.
Jung et al., Traffic Parameter Extraction using Video-based Vehicle Tracking, Kwangju Institute of Science and Technology, 1999, 6 pages.
Katramados et al., Real-Time Traversable surface detection by colour space fusion and temporal analysis, Cranfield University, School of Engineering, 2009, 10 pages.
Kipnis et al., Cryptanalysis of the HFE Public Key Cryptosystem, The Weizmann Institute of Science, Dec. 16, 1999, 15 pages.
Lepetit et al., EPnP: An accurate O(n) Solution to the PnP Problem, Computer Vision Laboratory, Jul. 19, 2008, 13 pages.
Lorigo et al., Visually-Guided Obstacle Avoidance in Unstructured Environments, MIT Artifical Intelligence Laboratory, Sep. 1997, 7 pages.
McFarlane et al., Segmentation and tracking of piglets in images, Silsoe Research Institute, 1999, 7 pages.
Miller et al., Landing a UAV on a Runway Using Image Registration, IEEE International Conference in Robotics and Automation, University of Central Florida, 2008, 6 pages.
Mittrapiyanuruk, Pradit, A Memo on How to Use the Levenberg-Marquardt Algorithm for Refining Camera Calibration Parameters, Robot Vision Labortory, Purdue University, 2006, 10 pages.
Moreno-Noguer et al., A Target Dependent Colorspace for Robust Tracking, Institut de Robotica i Informatica, 2006, 4 pages.
Moreno-Noguer et al., Integration of Shape and a Multihypotheses Fisher Color Model for Figure-Ground Segmentation in Non-Stationary Environments, Institut de Robotica i Informatica, Aug. 2004, 4 pages.
Olivares et al., Fuzzy Controller for UAV-landing task using 3D-position Visual Estimation, Computer Vision Group, University of Madrid, Jul. 2010, 8 pages.
Parks et al., Evaluation of Background Subtraction Algorithms with Post-processing, University of British Columbia, Jan. 2008, 9 pages.
PE&RS—Photogrammetric Engineering & Remote Sensing, The official journal for imaging and geospatial information and technology, Feb. 2015, pp. 83-170.
Piccardi, Massimo, Background subtraction techniques: a review, Computer Vision Group, University of Technology, Sydney, Australia, 2004, pp. 3099-3104.
Quan et al., Linear N-Point Camera Pose Determination, IEEE Transaction of Pattern Analysis and Machine Intelligence, Institute of Electrical and Electronics Engineers, 1999, pp. 774-780.
Oberkampf et al., Iterative Pose Estimation Using Coplanar Feature Points, Computer Vision laboratory, Center for Automation Research, University of Maryland, vol. 63, No. 3, May 1996, pp. 495-511.
Orghidan et al., Camera calibration using two or three vanishing points, Proceedings of the Federation Conference on Computer Science and Information Systems, 2012, pp. 123-130.
Rahman et al., A Multiscale Retinex for Color Rendition and Dynamic Range Compression, College of Eilliam & Mary Williamsburg, Nov. 14, 1996, 9 pages.
Ranganathan, Ananth, The Levenberg-Marquardt Algorithm, Jun. 8, 2004, 5 pages.
Remagnino et al., An Integrated Traffic and Pedestrian Model-Based Vision System, Department of Computer Science, The University of Reading, 1997, 10 pages.
Riggins, Jamie, Location Estimation of Obstacles for an Autonomous Surface Vehicle, Virginia Polytechnic Institute of State University, May 2006, 73 pages.
Roweis, Sam-Levenberg-Marquardt Optimization, 1996, 5 pages.
Slabaugh, Gregory—Computing Euler from a rotation Matrix, 1999, 7 pages.
Schaffalitzky et al., Planar Grouping for Automatic Detection of Vanishing Lines and Points, Department of Engineering Science, University of Oxford, Jul. 22, 2000, 21 pages.
Sharp et al., A Vision System for Landing an Unmanned Aerial Vehicle, Department of Electrical Engineering & Computer Science, University of California Berkeley, May 2001, pp. 1720-1727.
Sonnenburg et al., Control-Oriented Planar Motion Modeling of Unmanned Surfaced Vehicles, Virginia Center for Autonomous Systems, Virginia Polytechnic Institute & State University, Sep. 16, 2010, 44 pages.
Song et al., Defect detection in random colour textures, Department of Electronic and Electrical Engineering, University of Surrey, Aug. 12, 1994, 17 pages.
Snider, Jarrod, Automatic Steering Methods for Autonomous Automobile Path Tracking, Robotics Institute, Carnegie Mellon University, Feb. 2009, 78 pages.
Stauffer et al., Adaptive background mixture models for real-time tracking, The Artificial Intelligence Laboratory, Massachusetts Institute of Technology, 1999, 7 pages.
Suzukawa, Jr. et al., Long range airborne detection of small floating objects, SPIE vol. 2496/193, Aug. 1995, 12 pages.
Tall et al., Visual-Based Navigation of an Autonomous Surface Vehicle, Department of Ocean Engineering, Florida Atlantic University, Apr. 2010, 9 pages.

\* cited by examiner

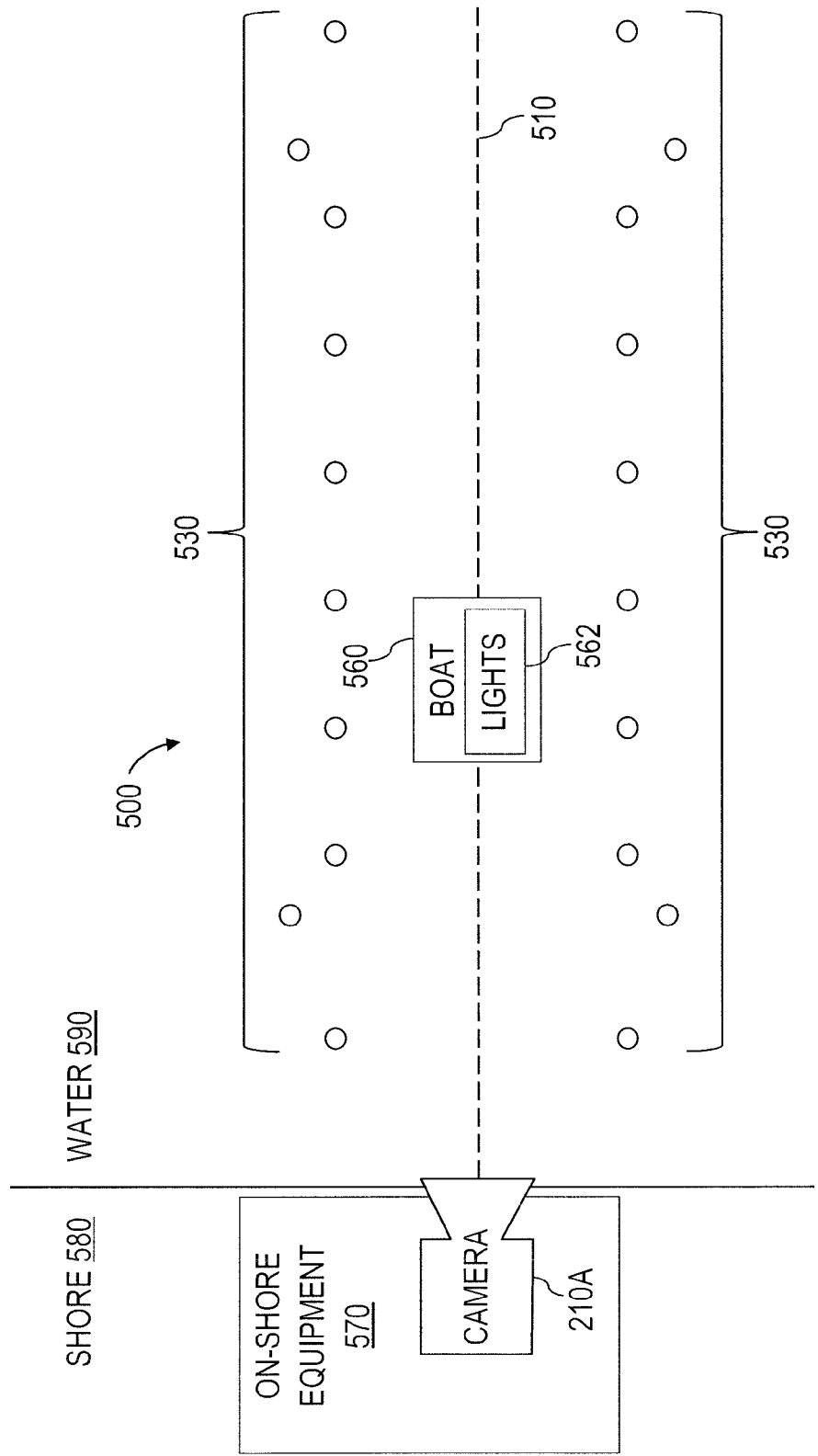

SYSTEMS AND METHODS FOR CONTROLLING VEHICLE POSITION AND ORIENTATION

CROSS-REFERENCE TO RELATED APPLICATION

This application claims the benefit of U.S. Provisional Patent Application Ser. No. 62/019,338, filed Jun. 30, 2014, the disclosure of which is hereby incorporated herein in its entirety by this reference.

TECHNICAL FIELD

Embodiments of the present disclosure relate generally to methods and apparatuses for analysis and control of vehicle movement. More specifically, embodiments of the present disclosure relate to analysis and control of watercraft for waterskiing applications.

BACKGROUND

The International Water Ski Federation (IWSF) is the governing body of competitive water skiing throughout the world. The IWSF specifically defines the objective of the slalom event as: "The contestant shall follow the towboat through the entrance gate of the slalom course, pass around the outside of any or all six buoys and proceed through the far end gate." FIG. 1 illustrates a water ski slalom course 100. A dotted line shows a centerline of the slalom course 100, which may be an expected path 110 of the towboat. A solid line shows an expected path 120 of a skier pulled by the towboat. Buoys 130 (marked in FIG. 1 by circles) including pre-gate buoys, entry gate buoys, guide buoys, turn buoys, and exit gate buoys mark paths the towboat and skier are required to navigate through the slalom course 100. For example, the towboat is required to navigate as close to the centerline as possible between the entry gate buoys, the guide buoys, and the exit gate buoys. Also, the skier is required to enter between the entry gate buoys, navigate outside the turn buoys, and exit between the exit gate buoys. The pre-gate buoys may be provided for the convenience of the driver of the towboat and the skier.

When a skier successfully navigates the slalom course 100, he or she has completed a pass. If a skier completes a pass, then the skier challenges himself or herself further by: (1) increasing the boat speed by a predefined amount, or (2) shortening the rope by some predetermined amount. A skier will continue to challenge himself or herself with the previous two options until he or she finds the limit of his or her ability. A skier will normally run anywhere from four to eight passes before tiring.

The current method for boat steering control is by a human driver. The ability to properly drive a boat, in terms of slalom driving, is a skill itself. If one wants to drive a sanctioned waterski tournament, then it is usually required that he or she have a driver's rating. Ratings are acquired by successfully completing driving clinics. Actual invitations to drive at tournaments are only given to those who have both the required rating and a positive reputation. The types of people who receive invitations to drive at tournaments are usually those who have been involved with the sport for anywhere from years to decades. Despite the restrictions set by the IWSF and efforts of tournament coordinators to ensure high quality veteran drivers, the drivers are still human. A human driver may suffer from distractions, boredom, and fatigue, which may inhibit performance. When a boat driver's performance suffers, a skier's performance may also suffer due to both physical and psychological issues associated with low quality boat driving.

Also, a boat driver's non-compliant performance may disqualify the skier's performance. If the boat path 110 deviates from the center line of the slalom course 100, then the skier may have an unfair advantage or disadvantage. When a skier completes a pass that may constitute a world record, the boat path of all passes in the set may be reviewed. A record may only be accepted if all boat path deviations in all passes of the set fall within the allowable tolerances set by the IWSF. In some cases, records are rejected due to an out of tolerance boat path.

BRIEF SUMMARY

In some embodiments, disclosed is a method of controlling water vehicle position and movement. The method includes identifying, with a computer, groups of pixels from video frame data corresponding to video image frames taken of at least a portion of a water course, the identified groups of pixels determined to correspond to objects in the water course. The method also includes correlating at least a portion of the identified groups of pixels with known objects in the water course, and estimating at least one of position and orientation of a water vehicle within the water course by analyzing positions of the groups of pixels within video image frames corresponding to the video frame data and known spatial positions of at least one of an image capture device that captured the video frame data and the known objects within the water course. The method further includes estimating at least one of steering parameters and acceleration parameters that are determined to navigate the water vehicle on a desired path through the water course. The method also includes transmitting, with the computer, navigation data including the at least one of the steering parameters and the acceleration parameters to at least one of a user interface and an automatic operating device. The user interface is configured to provide the at least one of the steering parameters and the acceleration parameters to a driver of the water vehicle. The automatic operating device is configured to receive the navigation data and automatically adjust at least one of steering and acceleration of the water vehicle according to the at least one of the steering parameters and the acceleration parameters.

In some embodiments, disclosed is a system including one or more image capture devices configured to provide data corresponding to video image frames of a course that a vehicle is to navigate through to one or more computers. The system may also include the one or more computers. The one or more computers are configured to receive the data corresponding to the video image frames from the one or more image capture devices. The one or more computers are also configured to execute computer-readable instructions including a segmentation software module, a model fitting software module, and a pose estimation software module. The segmentation software module is configured to identify groups of pixels from the video image frames that correspond to determined objects in the course. The model fitting software module is configured to correlate known objects in the course with the groups of pixels identified by the segmentation software module. The pose estimation software module is configured to estimate a position and orientation of the vehicle by analyzing image locations of the groups of pixels within the video image frames and known locations of at least one of the one or more image capture devices, and the known objects correlated with the groups of pixels by the model fitting module. The system also includes one or more interface devices operably coupled to the one or more computers and configured to at least partially automate navigation of the vehicle through the course.

In some embodiments, disclosed is a system including a water vehicle. The water vehicle includes an image capture device secured to the water vehicle. The image capture device is configured to capture video image frames of at least a portion of a water course. The water vehicle also includes a computer operably coupled to the image capture device. The computer includes at least one processing element operably coupled to at least one data storage device including computer-readable instructions stored thereon. The at least one processing element is configured to execute the computer-readable instructions. The computer-readable instructions are configured to instruct the at least one processing element to identify groups of pixels from the video image frames that correspond to determined non-background objects in the water course, correlate at least a portion of the identified groups of pixels with known objects in the water course, and estimate at least one of position and orientation of the water vehicle within the water course by comparing locations, within the video image frames, of the identified groups of pixels that correlate with the known objects in the water course to known locations of the known objects in the water course. The water vehicle further includes a user interface configured to provide human perceptible feedback to a driver of the water vehicle to indicate corrections to be made to at least one of a position, a direction, and a speed of the water vehicle.

BRIEF DESCRIPTION OF THE SEVERAL VIEWS OF THE DRAWINGS

FIG. 5B is a simplified view of a slalom course a boat is configured to navigate through.

DETAILED DESCRIPTION

In the following description, reference is made to the accompanying drawings in which is shown, by way of illustration, specific embodiments of the present disclosure. The embodiments are intended to describe aspects of the disclosure in sufficient detail to enable those skilled in the art to practice the invention. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

Embodiments of the disclosure include a system that resides inside a boat and can autonomously determine a static pose and dynamic motion vector (i.e., direction and velocity) of the boat. The system may also include feedback to cause the boat to autonomously adjust at least one of a speed of the boat and a direction of the boat to follow a predefined course and responsive to the determination of the boat's present pose and motion. In some embodiments, rather than an automated adjustment, the system may provide perceptible feedback to a human steering the boat to give the human suggested course corrections to follow the predefined course.

Figure 1:
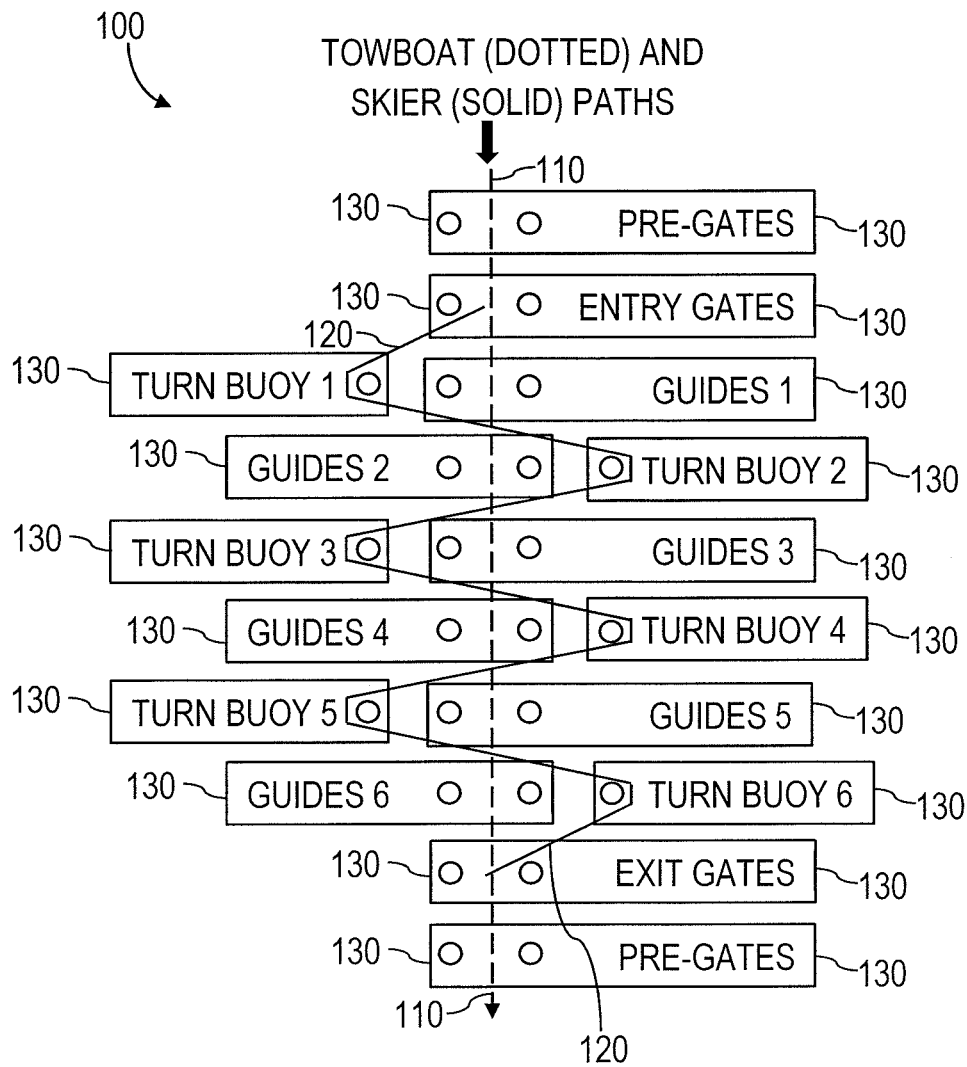
FIG. 1 illustrates a water ski slalom course.

As a non-limiting example, the predefined course may be a course for the boat to follow through a water ski slalom course 100 (FIG. 1).

In some embodiments, all of the components of the system may be positioned in the boat. Such embodiments may avoid issues that come with using external components such as the lack of infrastructure at lakes, the chance of vandalism to shore-installed components, and the challenge of wireless communication between external components and components residing in the boat. In other embodiments some of the components may be remote from the boat and communicate information to the system on the boat (e.g., wirelessly).

Figure 2:
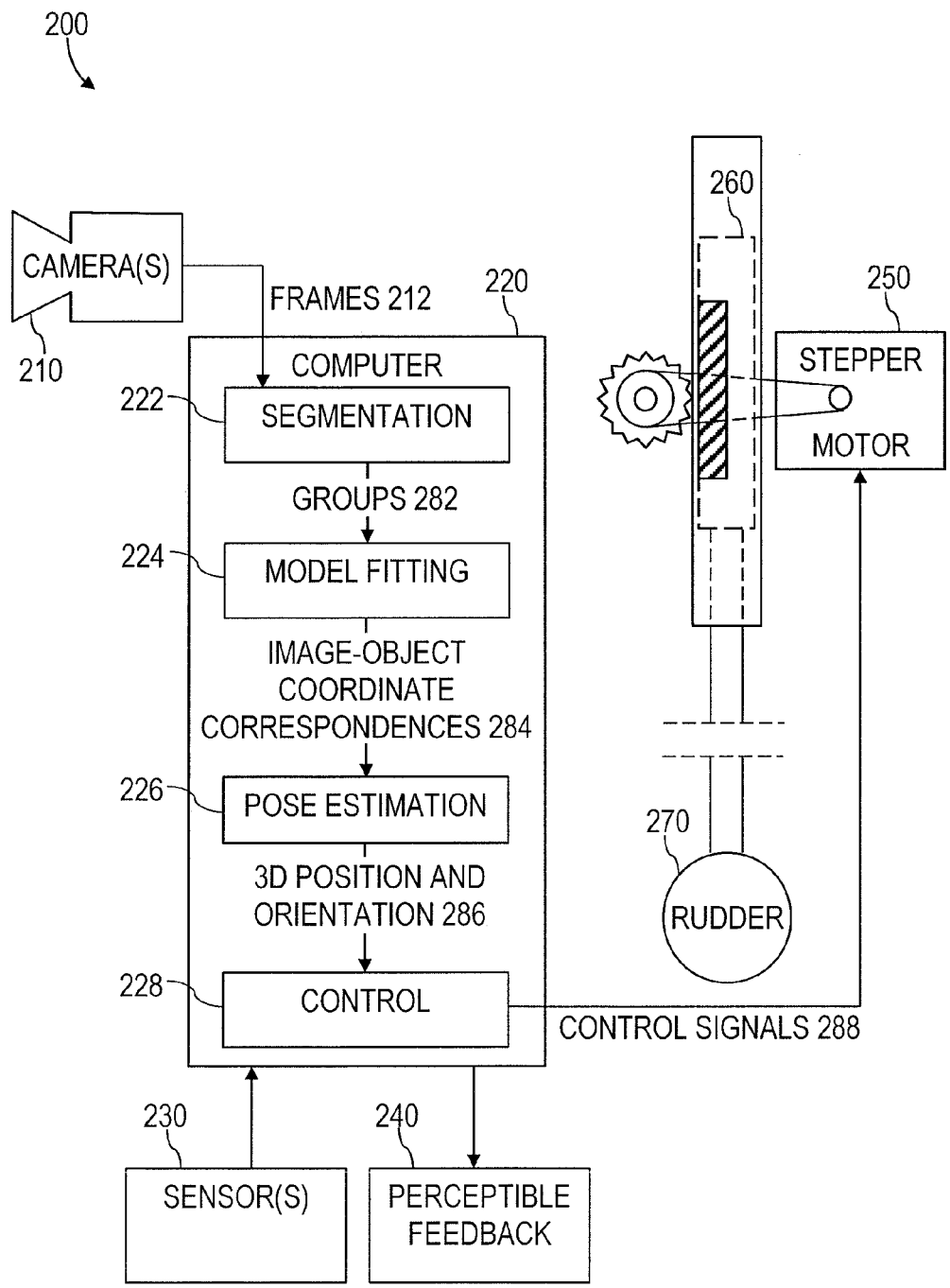
FIG. 2 illustrates a block diagram of a system for controlling position and movement of a water vehicle according to embodiments of the present disclosure.

FIG. 2 illustrates a block diagram of a system 200 for controlling position and movement of a water vehicle (e.g., a boat) according to embodiments of the present disclosure. The system 200 may include one or more computers 220 (hereinafter "computer" 220) operably coupled to one or more cameras 210 (hereinafter "camera" 210). The computer 220 may be configured to receive frames 212 of video images captured by the camera 210, and determine a position of a boat in a slalom course 100 (FIG. 1) by processing the frames 212 (e.g., using background subtraction processes, other processes, or combinations thereof). The computer 220 may also be configured to transmit navigation data including information indicating at least one of steering parameters and acceleration parameters determined to navigate the boat along a desired path (e.g., path 110 of FIG. 1) through the slalom course 100 to one or more interface devices (e.g., a user interface 450 of FIG. 4, an automatic operating device configured to adjust at least one of steering and acceleration of the boat, combinations thereof, etc.). In other words, the computer 220 may be configured to at least partially automate navigation of the vehicle through the course 100 using information taken from the frames 212.

In some embodiments, the computer 220 may be configured to use positional information taken from the frames 212 of the boat in the slalom course 100 (FIG. 1) to provide perceptible feedback 240 to a driver of the boat to assist the driver to properly steer the boat through the slalom course 100. In some embodiments, the computer 220 may be configured to use the positional information to automatically adjust the steering and/or speed of the boat (e.g., using an electrically controlled motor configured to adjust a steering element of the boat). More detail regarding the system 200 is discussed in Walker, C. (2014). *A Real-Time Vision System for a Semi-Autonomous Surface Vehicle*. MS Thesis, Arizona State University. Ann Arbor: ProQuest/UMI. (Publication No. AAT 1568071.), (hereinafter referred to herein as "Walker"), the entire disclosure of which is hereby incorporated herein in its entirety by this reference. A button or switch (not shown) within easy access of the driver of the boat may be included to enable and disable the system.

The camera 210 may be configured to capture images (e.g., video images) including the frames 212 of surroundings of the boat as it moves through the slalom course 100 (FIG. 1). In some embodiments, the camera 210 may be secured to the boat in a variety of different arrangements. By way of non-limiting example, the camera 210 may be arranged to face forward to capture images of scenery directly in front of the boat. In some embodiments, multiple cameras 210 may be arranged on the boat (e.g., a forward facing camera and a backward facing camera). Multi-view cameras 210 (e.g., three or more cameras) may be used for 3D reconstruction or other applications. In some embodiments, stereo vision may be implemented with multiple cameras 210. In some embodiments, multiple cameras 210 may be used for redundancy such that if one malfunctions, another may take over until a repair is possible.

In some embodiments, the camera 210 may be placed off of the boat (e.g., on shore, on other boats, on buoys, etc.) to capture images of the boat as it moves through the slalom course 100 (FIG. 1). In some embodiments, cameras 210 may be placed both on the boat and off the boat to provide a more complete picture of the boat's progress through the slalom course 100. If placed on the boat, the camera 210 may be positioned to constantly capture up-close detailed images of immediate surroundings of the boat (i.e., a dynamic background). If placed in a static off-boat location, the camera 210 may be positioned to capture images of the moving boat against a static background (i.e., a static background, for which background calibration for background subtraction processes may be simpler than for dynamic background images).

In some embodiments, the camera 210 may include alternative optical sensors. By way of non-limiting example, the camera 210 may include electromagnetic radiation (EMR) sensors configured to detect different wavelengths other than visible light. For example, the camera 210 may include an infrared camera or ultraviolet camera. A camera 210 capable of detecting any portion of the entire EMR spectrum is contemplated herein. Light Radar (LIDAR) sensors are also contemplated. In some embodiments, the buoys 130 (FIG. 1) may follow the specifications set forth in the IWSF tournament rulebook in terms of size, color, and position. In some embodiments, the buoys 130 may emit a signal that may be detected by the camera 210, the sensors 230, or a combination thereof. For example, the buoys 130 could be fitted with IR transmitters so that an IR camera can easily detect the buoys 130.

Other possible camera 210 configurations may include fisheye lenses, an omni-directional camera system, and shoreline cameras. Shoreline cameras (and possible processing accompanying the shoreline cameras) may be used to perform the position/orientation calculation of a boat. Image data from the shoreline cameras, pose data of the boat calculated on-shore using the image data from the shoreline cameras, or combinations thereof may be transmitted to the computer 220 in the boat and integrated with sensors 230 onboard the boat. Other cameras may also be used to develop dynamic imaging with a higher dynamic range.

The camera 210 may be configured to provide the frames 212 to the computer 220 (e.g., through wired transmission lines, wireless transmission lines, or a combination thereof). In embodiments where the camera 210 is mounted in the boat, each of the frames 212 may include regions of pixels representing objects (e.g., buoys 130, jump ramps, and other markers) and regions of pixels corresponding to a background. In embodiments where the camera 210 includes one or more static (i.e., non-moving) on-shore cameras configured to monitor the entire slalom course, regions of pixels representing the boat (e.g., the boat itself, identifiable markings on the boat, lights on the boat, etc.) may also be included in the frames 212. If lights are placed on a boat or on buoys to improve contrast between such objects and the background in the frames 212, the lights may be adjustable or interchangeable to adapt to different background conditions. Adjustable or interchangeable lights may enable different colors of lights to be used during different times of the day or against different backgrounds to provide better contrast.

In some embodiments, the computer 220 may reside on the boat. In some embodiments, the computing processes may be distributed such that some of the processing is performed on a computer remote (e.g., onshore, on another boat, etc.) from the boat and some of the processing is performed on the local computer 220 on the boat. In such embodiments, the local computer 220 and the remote computer may communicate to pass information related to the processes of the present embodiments.

It may be advantageous in some instances to perform the processing of the computer 220 on the boat in order to avoid issues that may arise from placing the remote computer remote from the boat (e.g., onshore). For example, issues that may arise from an onshore remote computer may include lack of electronic and network infrastructure at lakes, the chance of vandalism to shore-installed components, and the challenge of wireless communication between external components and components residing in the boat. It should be noted, however, that in some embodiments, the computer 220 may be placed on shore instead of, or in addition to, on the boat, despite the possible advantages of the on-boat computer 220.

In some embodiments, the computer 220 may be configured to execute software processes to take input (e.g., frames 212) from the camera 210 and/or sensor(s) 230 to generate pose estimations (e.g., 3D position and orientation 286) and provide perceptible feedback 240 to guide a driver of the boat. The software processes may roughly include a segmentation module 222, a model fitting module 224, and a pose estimation module 226. As used herein, the term "module" refers to a software module including computer-readable instructions configured to instruct one or more processors 410 (FIG. 4) to perform functions of the module, the computer-readable instructions stored by a non-transitory computer-readable medium (e.g., memory 420, storage 430 (FIG. 4), and a combination thereof) operably coupled to the one or more processors 410. In some embodiments, the software processes may also include a control module 228 configured to generate control signals 288 to control a steering device of the boat in addition to, or instead of, providing the perceptible feedback 240.

The segmentation module 222 may be configured to identify buoys 130 (FIG. 1) and other objects (e.g., the boat for off-boat camera images) in captured frames 212 from the camera 210. By way of non-limiting example, the segmentation module 222 may be configured to differentiate buoys 130 and other objects from background scenery. The background scenery may be identified by one or more background models used by the segmentation module 222. In some embodiments, the segmentation module 222 may use different background models depending on a direction the camera 210 is pointing (e.g., different directions of travel of the boat if the camera is mounted to the boat). The segmentation module 222 may be configured to label each pixel from the frames 212 as non-background pixels (e.g., pixels corresponding to buoys 130, boat markings, lights on the boat, etc.), and background pixels. The segmentation module 222 may then group non-background pixels that share similar vicinities into groups 282 (see also FIG. 3B). For example, the separate groups 282 may correspond to separate buoys 130, a boat, etc., and other slalom course markers. In other words, the segmentation module 222 may be capable of differentiating groups of pixels that may correspond to different objects of the frames 212 from the background. Also by way of non-limiting example, the segmentation module 222 may be configured to use other processes to identify objects in the slalom course 100 (e.g., the segmentation module 222 may be configured to detect pixels having similar colors to known objects in the slalom course 100).

A single forward facing camera 210 may lose sight of slalom course buoys before the boat exits the slalom course. Additional buoys or shoreline objects may be included at the end of the course in order to provide continued guidance as the boat finishes the slalom course. In addition, the computer 220 may use other viewable objects in the visual processing portion of the system 200. The computer 220 may learn jump ramp positions, then use this knowledge to improve visual processes. The computer 220 may also learn the position of certain shoreline objects and use this information to improve system performance. Any object that can be consistently identified has the potential of serving as a visual reference to the system 200.

Figure 3A:
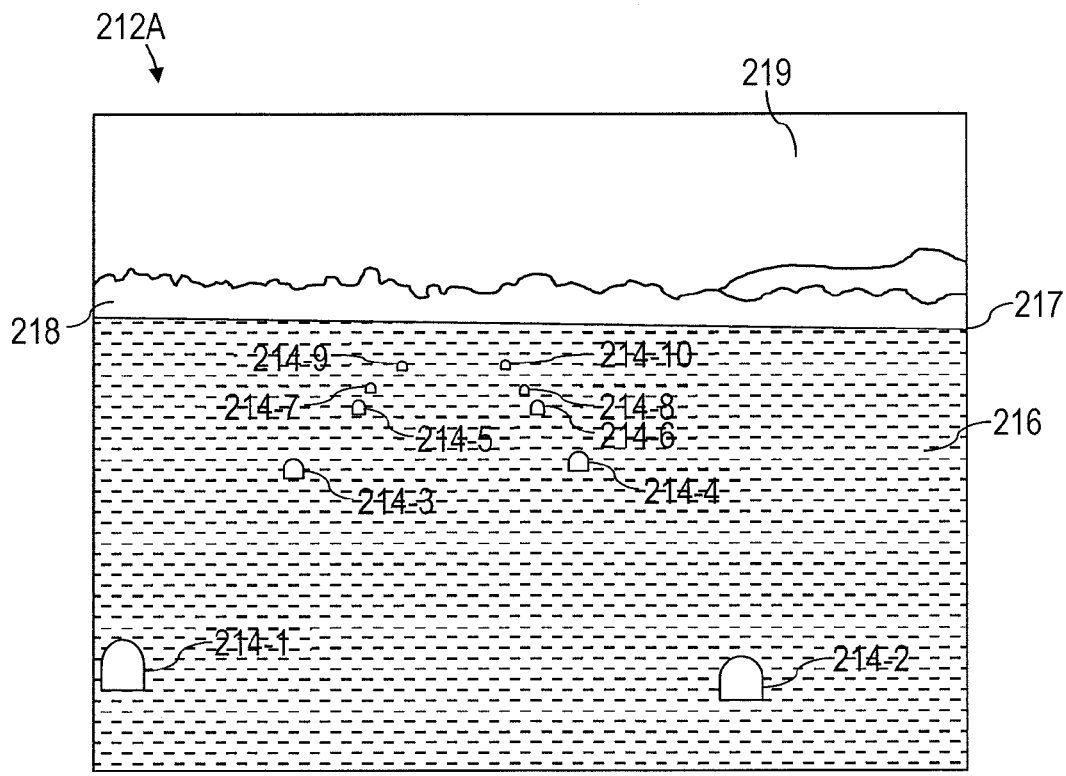
FIG. 3A illustrates a simplified example of a frame captured by the camera of FIG. 2.

FIG. 3A is a simplified view of a non-limiting example of an image corresponding to a frame 212A captured by the camera 210. Referring now to FIGS. 2 and 3A together, the frame 212A may include a number of buoys 214 (i.e., buoys 214-1 through 214-10) floating in water 216. The frame 212A of FIG. 3A also includes shore 218 and sky 219.

Figure 3B:
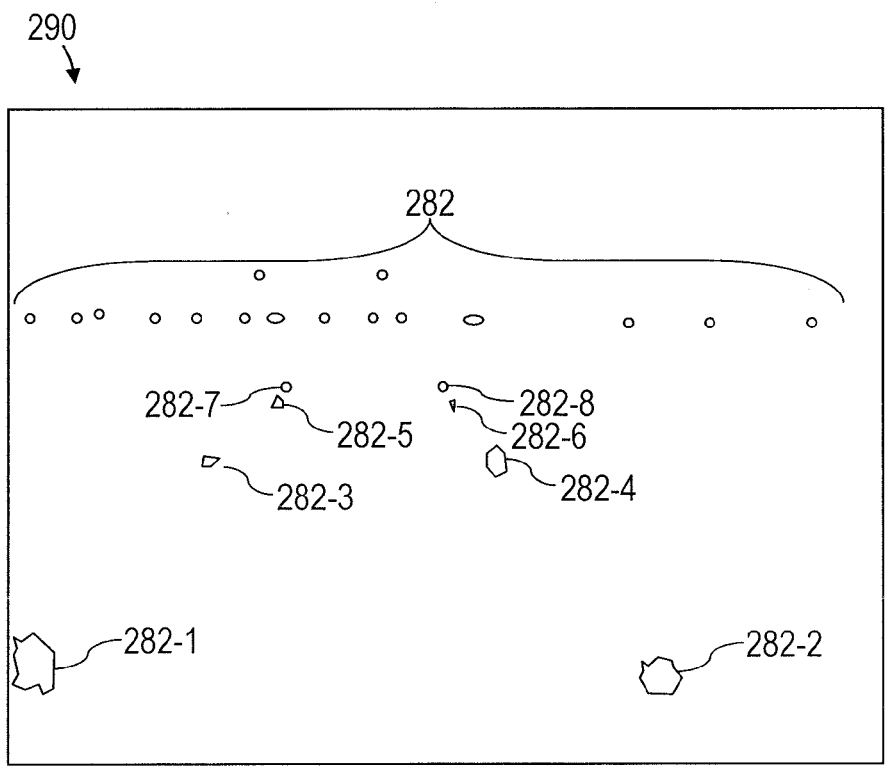
FIG. 3B illustrates a simplified group map of the example frame of FIG. 3A.

The segmentation module 222 may be configured to identify groups 282 of pixels from the frame 212A that may be objects in the slalom course 100 (FIG. 1). FIG. 3B is a simplified map 290 of groups 282 identified by the segmentation module 222 by performing a segmentation process on the frame 212A of FIG. 3A. Referring now to FIGS. 2 through 3B together, as may be seen by comparing the map 290 of FIG. 3B to the frame 212A of FIG. 3A, some of the groups 282 (i.e., groups 282-1 through 282-8) of FIG. 3B may correspond to some of the buoys 214 (i.e., buoys 214-1 through 214-8) of FIG. 3A. It may also be seen that the segmentation module 222 failed to identify groups 282 corresponding to buoys 214-9 and 214-10. It may be further seen that the segmentation module 222 identified several other groups 282 that do not correspond to any of the buoys 214 shown in the frame 212A.

The segmentation module 222 may be configured to utilize any of various different segmentation processes to identify pixels corresponding to objects in the frames 212. In some embodiments, the segmentation module 222 may be configured to use a visual background extractor (ViBe) process. ViBe processes are discussed in Barnich, Olivier, and Marc Van Droogenbroeck, "ViBE: a powerful random technique to estimate the background in video sequences," *Acoustics, Speech and Signal Processing,* 2009. ICASSP 2009. *IEEE International Conference on.* IEEE 2009, and Barnich, Olivier, and Marc Van Droogenbroeck. "ViBe: A universal background subtraction algorithm for video sequences." *Image Processing, IEEE Transactions on* 20.6 (2011): 1709-1724, the entire disclosures of both of which are hereby incorporated herein by this reference in their entirety. ViBe is an approach to background subtraction that relies on a set of retained samples rather than statistical information. One difference between the ViBe process and other background subtraction processes is that ViBe uses conservative updating and a spatial updating scheme. In a conservative updating scheme, only data classified as background is used to update the background model. In a spatial updating scheme, an incoming pixel not only updates its corresponding background value, but also updates a neighboring pixel's corresponding background value. If a pixel in an incoming frame is classified as background, then its value is used to update the corresponding pixel sample set at some randomly selected sample index. It is also used to update one of the corresponding pixel's randomly selected neighbors at a random sample index.

In some embodiments, the segmentation module 222 may be configured to use other segmentation processes. By way of non-limiting example, the segmentation module 222 may be configured to use either of block-level segmentation (see Wei, Zhao-Yi, et al. "Motion projection for floating object detection." *Advances in Visual Computing* (2007): 152-161, the entire disclosure of which is hereby incorporated herein by this reference), and pixel level floating object detection segmentation (see Alexander, Borghgraef, et al. "An evaluation of pixel-based methods for the detection of floating objects on the sea surface." *EURASIP Journal on Advances in Signal Processing* 2010 (2010), the entire disclosure of which is hereby incorporated herein in its entirety). Pixel level floating object detection segmentation may include any of running mean segmentation (see Piccardi, Massimo. "Background subtraction techniques: a review." *Systems, man and cybernetics,* 2004 *IEEE international conference on.* Vol. 4. IEEE, 2004.), running single Gaussian processes (see Wren, Christopher Richard, et al. "Pfinder: Real-time tracking of the human body." *Pattern Analysis and Machine Intelligence, IEEE Transactions on* 19.7 (1997): 780-785 (hereinafter "Wren"), and Intille, Stephen S., James W. Davis, and Aaron F. Bobick. "Real-time closed world tracking." *Computer Vision and Pattern Recognition,* 1997. *Proceedings.,* 1997 *IEEE Computer Society Conference on.* IEEE, 1997 (hereinafter "Intille"), the entire disclosures of both of which are hereby incorporated herein by this reference), Gaussian mixture model segmentation (see Stauffer, Chris, and W. Eric L. Grimson. "Adaptive background mixture models for real-time tracking." *Computer Vision and Pattern Recognition,* 1999. *IEEE Computer Society Conference on.* Vol. 2. IEEE, 1999 (hereinafter "Stauffer"), the entire disclosure of which is hereby incorporated herein in by this reference), and extended Gaussian mixture model processes (see Zivkovic, Zoran. "Improved adaptive Gaussian mixture model for background subtraction." *Pattern Recognition,* 2004. ICPR 2004. *Proceedings of the 17$^{th}$ International Conference on.* Vol. 2. IEEE, 2004, and Zivkovic, Zoran, and Ferdinand van der Heijden. "Efficient adaptive density estimation per image pixel for the task of background subtraction." *Pattern recognition letters* 27.7 (2006): 773-780, the entire disclosures of both of which are hereby incorporated herein by reference) to classify pixels as either representative of background, or non-background objects.

Also by way of non-limiting example, the segmentation module 222 may be configured to use behavior subtraction (see Jodoin, P., Janusz Konrad, and Venkatesh Saligrama. "Modeling background activity for behavior subtraction." *Distributed Smart Cameras, 2008. ICDSC 2008. Second ACM/IEEE International Conference on*. IEEE, 2008, the entire disclosure of which is hereby incorporated herein by this reference), pixel level background subtraction (see Piccardi, Massimo, "Background subtraction techniques: a review," *Systems, man and cybernetics, 2004 IEEE international conference on*. Vol. 4. IEEE, 2004., Cheung, Sen-Ching S., and Chandrika Kamath. "Robust techniques for background subtraction in urban traffic video." *Proceedings of SPIE*. Vol. 5308. No. 1. 2004. (hereinafter "Cheung"), and Parks, Donovan and Sidney S. Fels. "Evaluation of background subtraction algorithms with post-processing." *Advanced Video and Signal Based Surveillance, 2008. AVSS'08, IEEE Fifth International Conference on*. IEEE., 2008. (hereinafter "Parks"), the entire disclosure of each of which is hereby incorporated herein by reference), image differencing (i.e., creating a foreground mask by differencing a current frame 212 with an image of a current background model, and assigning pixels from the current frame as background if they are not different from the current background model by at least some threshold level), adaptive mean processing (see Piccardi, Massimo. "Background subtraction techniques: a review." *Systems, man and cybernetics, 2004 IEEE international conference on*. Vol. 4. IEEE, 2004., and Walther, Dirk, Duane R. Edgington, and Christof Koch. "Detection and tracking of objects in underwater video." *Computer Vision and Pattern Recognition, 2004, CVPR 2004. Proceedings of the 2004 IEEE Computer Society Conference on*. Vol 1 IEEE, 2004, the entire disclosure of both of which are hereby incorporated herein by reference), an adaptive single Gaussian model (see Wren and Intille), an adaptive Gaussian mixture model (see Stauffer), an adaptive median filter (see Cheung and Parks; see also McFarlane, Nigel J B, and C. Paddy Schofield. "Segmentation and tracking of piglets in images." *Machine Vision and Applications* 8.3 (1995): 187-193, Remagnino, Paolo, et al. "An Integrated Traffic and Pedestrian Model-Based Vision System." *BMVC*. 1997, and Jung, Young-Kee, and Yo-Sung Ho, "Traffic parameter extraction using video-based vehicle tracking." *Intelligent Transportation Systems, 1999. Proceedings. 1999 IEEE/IEEJ/JSAI International Conference on*. IEEE, 1999., the entire disclosure of both of which are hereby incorporated herein by reference), difference of Gaussians (see Winnemöller, Holger, Jan Eric Kyprianidis, and Sven C. Olsen. "XDoG: an extended difference-of-Gaussians compendium including advanced image stylization." *Computers & Graphics* 36.6 (2012): 740-753., and Rahman, Zia-ur, Daniel J. Jobson, and Glenn A. Wooden. "Multiscale retinex for color rendition and dynamic range compression." *SPIE's 1996 International Symposium on Optical Science, Engineering, and Instrumentation*. International Society for Optics and Photonics, 1996., the entire disclosure of both of which are hereby incorporated herein by reference), and color-based methods (see Tall, M. H., et al. "Visual-Based Navigation of an Autonomous Surface Vehicle." *Marine Technology Society journal* 44.2 (2010): 37-45, Song, Keng Yew, Josef Kittler, and Maria Petrou. "Defect detection in random colour textures." *Image and Vision Computing* 14.9 (1996): 667-683, Alvarez, José M., A. López, and Ramon Baldrich. "Illuminant-invariant model-based road segmentation." *Intelligent Vehicles Symposium, 2008 IEEE*. IEEE, 2008, Moreno-Noguer, Francesc, Alberto Sanfeliu, and Dimitris Samaras. "A target dependent colorspace for robust tracking." *Pattern Recognition, 2006. ICPR 2006. 18th International Conference on*. Vol 3 IEEE, 2006, Moreno-Noguer, Francesc, and Alberto Sanfeliu. "Integration of shape and a multihypotheses fisher color model for figure-ground segmentation in non-stationary environments." *Pattern Recognition, 2004. ICPR 2004. Proceedings of the 17th International Conference on*. Vol. 4. IEEE, 2004, Chong, Hamilton Y., Steven J. Gortler, and Todd Zickler. "A perception-based color space for illumination-invariant image processing." *ACM Transactions on Graphics (TOG)* 27.3 (2008): 61, Yilmaz, Alper, Omar Javed, and Mubarak Shah. "Object tracking: A survey." *Acm computing surveys (CSUR)* 38.4 (2006): 13, Lorigo, Liana M., Rodney A. Brooks, and W. E. L. Grimsou. "Visually-guided obstacle avoidance in unstructured environments." *Intelligent Robots and Systems, 1997. IROS'97., Proceedings of the 1997 IEEE/RSJ International Conference on*. Vol 1. IEEE, 1997, and Katrarnados, Ioannis, Steve Crumpler, and Toby P. Breckon. "Real-time traversable surface detection by colour space fusion and temporal analysis." *Computer Vision Systems* (2009): 265-274, the entire disclosure of each of which is hereby incorporated herein by reference).

Although many different segmentation processes may be employed by the segmentation module 222, testing of ViBe processes indicates that ViBe processes may provide an appropriate balance of simplicity and performance for carrying out functions of the segmentation module 222. Regardless of the process used by the segmentation module 222 to label each of the pixels in the frames 212, the segmentation module 222 may be configured to group non-background pixels together with surrounding pixels to identify groups of non-background pixels. By way of non-limiting example, the segmentation module 222 may be configured to identify groups of pixels corresponding to buoys from a frame 212.

The segmentation module 222 may be configured to provide the groups 282 to the model fitting module 224. The model fitting module 224 may be configured to correlate groups 282 identified by the segmentation module 222 with known objects in the slalom course 100 (FIG. 1) to produce data 284 corresponding to image-object coordinate correspondences (hereinafter "image-object coordinate correspondences" 284). In other words, the model fitting module 224 may be configured to assign known objects in the slalom course 100 to specific groups 282 that appear to be generated from pixels corresponding to the known objects. By way of non-limiting example, the model fitting module 224 may be configured to correlate groups 282-1 through 282-8 with buoys 214-1 through 214-8 that are known to be present in the slalom course 100. The model fitting module 224 may be configured to generate image-object coordinate correspondences data 284 (hereinafter referred to as "image-object coordinate correspondences" 284) indicating groups 282 that are assigned to the known objects in the slalom course 100.

The model fitting module 224 may assign each known object in the slalom course 100 (FIG. 1) to a unique group 282 for every frame 212. In some embodiments, once a known object is assigned to a group 282, the assigned group 282 may not be considered when assigning subsequent known objects to groups 282. In some embodiments, each of the known objects in the slalom course 100 may be correlated with a different group 282 separately. Portions of the slalom course 100, however, may be defined by pairs of buoys 214, as shown by the buys 130 of FIG. 1 (e.g., pre-gate buoys, the entry gate buoys, the guide buoys, and the exit gate buoys of FIG. 1), and the buoys 214 of FIG. 3A. Accordingly, in some embodiments, the model fitting module 224 may attempt to correlate known buoy pairs (e.g., buoys 214-1 and 214-2 may form a pair, buoys 214-3 and 214-4 may form a pair, buoys 214-5 and 214-6 may form a pair, buoys 214-7 and 214-8 may form a pair, and buoys 214-9 and 214-10 may form a pair) with pairs of groups 282 identified by the segmentation module 222. The pairs of the groups 282 (e.g., groups 282-1 and 282-2 may form a group pair, groups 282-3 and 282-4 may form a group pair, and so on) may be considered for correlation with every possible known buoy pair. In some embodiments, every group pair may be ranked based on its suitability for correlation with each of the known buoy pairs.

In some embodiments, the model fitting module 224 may be configured to rank the groups 282 or group pairs for their fitness to be correlated to the various known objects or known object pairs using scoring functions. The scoring functions may quantitatively assess the fitness of correlations between the various groups 282 (or group pairs) to known buoys 214 (or buoy pairs) and other known objects in the slalom course 100 (FIG. 1) based, at least in part, on one or more metrics (e.g., assigning a relatively higher score when the group 282 or group pair shows a higher level of fitness to be correlated to a known object or object pair). The model fitting module 224 may then assign the group 282 or group pair with the highest score to the corresponding known object or object pair. Separately, the one or more metrics may be relatively inconsistent at accurately correlating a group 282 (or pair of groups) to a known object (or pair of known objects). When multiple metrics are combined, however, the scoring functions may be relatively more consistent at correlating groups 282 accurately.

Specific examples of contemplated scoring functions are provided below. These specific examples (as well as examples of constraining functions that are discussed below) may be non-limiting, and may be specific to embodiments where the camera 210 is mounted on the boat above water, with an optical axis of the camera 210 oriented substantially parallel to the direction of boat travel (e.g., within about 5 degrees of the direction of boat travel), and a rotation of the camera 210 about the optical axis is substantially in an upright configuration (i.e., a surface of the water 216 in frames 212 captured thereby will be substantially horizontal). These specific scoring functions may include order independent scoring functions, order dependent scoring functions, and combinations thereof. Other scoring functions are also contemplated within the scope of the disclosure, some of which are disclosed in Walker.

By way of non-limiting example, the order independent scoring functions may include similar slope scoring functions, in which it is acknowledged that a slope of a line passing through a pair of image buoys 214 is about the same as a slope of a line passing through other pairs of image buoys 214 (e.g., the slope of a line drawn through buoys 214-1 and 214-2 would be about the same as the slope of a line drawn through buoys 214-3 and 214-4). Accordingly, if one or more group pairs have already been correlated with one or more known buoy pairs, then subsequent group pairs that should be correlated with subsequent buoy pairs should be identifiable by the characteristic that the slope of lines drawn between the groups 282 in the subsequent group pairs should have a similar slope as that of previously correlated group pairs. Pairs of groups 282 fitting this characteristic may be good candidates for correlation with buoy pairs (and so should be given a relatively high score). Also, the similar slope scoring function acknowledges that even if no correlations have previously been made, the slope of lines drawn between groups 282 in group pairs that correlate with buoy pairs should be substantially horizontal. Accordingly, if no previous correlations have been made, pairs of groups 282 that form substantially horizontal lines when lines are drawn therethrough may be good candidates for correlation with known buoy pairs (and so should be given a relatively high score).

Also by way of non-limiting example, the order independent scoring functions may include similar area scoring functions, which acknowledge that known buoys 214 of the same pair should be at about the same distance from the camera 210, and should have similar numbers of pixels dedicated thereto in the frames 212. Accordingly, groups 282 that should correlate to buoys 214 in the same buoy pair should have similar areas. By way of non-limiting example, groups 282-1 and 282-2, which correlate with the buoys 214-1 and 214-2 in the same buoy pair, both have larger areas than the other groups 282 because the buoys 214-1 and 214-2 are closer to the camera 210 than the other buoys 214. Thus, if the model fitting module 224 identifies two groups 282 having a similar area, a group pair including the two groups 282 may be a good candidate for correlation with a buoy pair (and so should be given a relatively high score).

As a further non-limiting example, the order independent scoring functions may include similar center scoring functions, which acknowledge that groups 282 corresponding to known buoys 214 should be found in a similar location in the map 290 as groups 282 from a previous frame that have been correlated with the known buoys 214. In other words, if for a first frame 212, a group 282 is correlated with a buoy 214, in a map 290 corresponding to the next frame 212, a group 282 corresponding to the buoy 214 should be identified relatively close to a same location in the map 290 as the group 282 corresponding to the first frame 212. Therefore, if the model fitting module 224 encounters a group 282 having its center relatively proximate to a center of a group 282 corresponding to a known buoy 214 from a previous frame 212, the group 282 may be a good candidate for correlating to the known buoy 214 (and so should be given a relatively high score). It should be noted that other order independent scoring functions are also contemplated within the scope of the disclosure, and the examples of order independent scoring functions explicitly provided herein are exemplary, and not limiting.

In some embodiments, the scoring functions may include order dependent scoring functions. By way of non-limiting example, the order dependent scoring functions may include widest pair scoring functions, which acknowledge that the further apart buoys 214 appear in the frames 212, the closer the buoys 214 are to the camera 210 (e.g., buoys 214-1 and 214-2 are farther apart than the buoys 214 in other buoy pairs). Thus, if the model fitting module 224 encounters a group pair including groups 282 that are spaced relatively far apart from each other on the map 290, the group pair may be a good candidate for correlation with a buoy pair that is relatively close to the camera 210 (and so should be given a relatively high score).

Also by way of non-limiting example, the order dependent scoring functions may include lowest pair scoring functions, which acknowledge that a pair of known buoys 214 that is relatively close to the camera 210 may be displayed relatively close to a bottom of the frame 212. By way of non-limiting example, buoys 214-1 and 214-2 are the lowest of the buoys 214 of frame 212A, and therefore correspond to the closest buoys 214 to the camera 210. Thus, if the model fitting module 224 encounters a group pair including groups 282 that are positioned relatively low in the map 290, the group pair may be a good candidate for correlation with a buoy pair that is relatively close to the camera 210 (and so should be given a relatively high score). It should be noted that other order dependent scoring functions are also contemplated within the scope of the disclosure, and the examples of order dependent scoring functions explicitly provided herein are exemplary, and not limiting.

In addition to the scoring functions, in some embodiments the model fitting module 224 may also use constraining functions configured to flag invalid groups 282 and group pairs as not correlating with known objects in the slalom course. In other words, the constraining functions may be configured to determine if groups 282 and group pairs do not appear to correspond to a known object in the slalom course. The constraining functions may be configured to invalidate individual groups 282, pairs of groups 282, or combinations thereof. In some embodiments, these constraining functions may be executed before the scoring functions to reduce the number of groups 282 that are required to be considered using the scoring functions.

The constraining functions may be configured to identify groups 282 that have properties that are inconsistent with the known objects in the slalom course. By way of non-limiting example, the constraining functions may be configured to flag groups 282 that have shapes that are inconsistent with known objects (e.g., oblong-shaped groups 282 generally do not correspond to buoys 214). Also by way of non-limiting example, the constraining functions may be configured to flag groups 282 that have a larger area than is consistent with the known objects (e.g., a buoy 214 may only grow to a specific maximum pixel area until the buoy 214 is expected to escape from a field of view of the camera 210). As a further non-limiting example, the constraining functions may be configured to flag groups 282 that are too small to accurately represent buoys 214 (e.g., buoy pixels corresponding to buoys 214 at relatively large distances from the camera 210 may sometimes be converted into inconsistently positioned and/or sized groups 282 by the segmentation module 222). As a further non-limiting example, the constraining functions may be configured to flag groups 282 that are located in positions on the map 290 that correspond to areas of the frame 212 that are above a shoreline 217 of the frame 212.

In some embodiments, the constraining functions may be configured to consider information gathered from tracking known objects in the slalom course 100 (FIG. 1) in analyzing the groups 282. By way of non-limiting example, if a group 282 that occupies an area on the map 290 that is larger than a group 282 corresponding to a currently tracked known object (i.e., implying that the larger group 282 may correspond to an object closer to the camera 210 than the currently tracked known object), but appears to correspond to an object that is actually farther away from the camera 210 than the currently tracked known object (e.g., the group 282 is located higher in the map 290 than a group 282 corresponding to the currently tracked known object, etc.), the group 282 may be removed from consideration for correlation with the known objects. Similarly, if a group 282 that occupies an area on the map 290 that is smaller than a group 282 corresponding to a currently tracked known object (i.e., implying that the smaller group 282 should correspond to an object further from the camera 210 than the currently tracked known object), but appears to correspond to an object that is actually closer to the camera 210 than the currently tracked known object (e.g., the group 282 is located lower in the map 290 than a group 282 corresponding to the currently tracked known object, etc.), the group 282 may be removed from consideration for correlation with the known objects.

It may be expected that groups 282 and pairs of groups 282 that correspond to known buoys 214 in the slalom course 100 (FIG. 1) should adhere to certain positional constraints within the map 290. By way of non-limiting example, groups 282 corresponding to buoys 214 may be expected to lie on or near diagonal lines extending through the groups 282 (e.g., a diagonal line may extend through groups 282-1, 282-3, 282-5, 282-7, and another diagonal line may extend through groups 282-2, 282-4, 282-6, and 282-8). Also by way of non-limiting example, at least one group 282 in a pair of groups 282 that corresponds to a buoy pair that is further away from the camera 210 than a closer buoy pair should be located on the map 290 between vertical lines drawn through groups 282 corresponding to the closer buoy pair. Similarly, at least one group 282 in a pair of groups 282 that corresponds to a buoy pair that is closer to the camera 210 than a further buoy pair should be located on the map 290 outside of vertical lines drawn through groups 282 corresponding to the further buoy pair. Furthermore, a distance (e.g., in pixels) between a pair of groups 282 corresponding to a closer buoy pair that is closer to the camera 210 than a further buoy pair should be greater than a distance between groups 282 corresponding to the further buoy pair. Moreover, the slope of lines drawn through the groups 282 in each group pair corresponding to the buoy pairs should be approximately parallel with the lines drawn through the groups 282 in each of the other group pairs. If any of the groups 282 do not satisfy these, or other expected characteristics, constraining functions may remove the non-compliant groups from consideration for correlation with the known objects. Other constraint functions are also contemplated. By way of non-limiting example, additional constraining functions are disclosed in Walker.

As previously mentioned, the correlation between the various groups 282 and the known objects in the slalom course 100 (FIG. 1) may be based, at least in part, on one or more of the scoring functions. After the one or more scoring functions have been executed, groups 282 having the highest scores for correlation with the known objects may be assigned to those known objects. The image-object coordinate correspondences 284 generated by the model fitting module 224 may indicate those correlations. The model fitting module 224 may be configured to provide the image-object coordinate correspondences 284 to the pose estimation module 236.

The pose estimation module 226 may be configured to receive the image-object coordinate correspondences 284 and generate data 286 including 3D position and orientation information (hereinafter "3D position and orientation" 286) of the boat using the image-object coordinate correspondences 284. Specifically, the pose estimation module 226 may use image coordinates of the groups 282 assigned to known objects in the slalom course 100 (FIG. 1) and known spatial coordinates of the known objects in the slalom course 100 to estimate a position and orientation of the boat within the slalom course 100 (sometimes referred to herein as "pose" of the boat). The pose estimation module 226 may be configured to generate the 3D position and orientation 286 including the pose information.

In some embodiments, the pose information may be estimated by making a preliminary estimate, and using nonlinear least squares optimization techniques to refine the preliminary estimate. By way of non-limiting example, Levenberg-Marquardt optimization processes may be used to refine preliminary estimates of the pose information.

The preliminary estimate may be made by analyzing the relationship between a camera space as perceived in the frames 212 captured by the camera 210 and object space occupied by the actual known objects of the slalom course.

In some embodiments, the preliminary estimate may be made using one of a "complete" linear system method and a "simple" method, both of which are disclosed in Walker (at pages 135 through 145). The complete linear system method may seek to identify the object space within the image space by identifying hypothetical lines between groups corresponding to known objects (e.g., diagonal lines of buoys, lines between buoy pairs, etc.) and using those hypothetical lines to identify vanishing coordinates of main axes of the object space using a direct linear transformation, linear algebra, and projective space. The simple method may combine trigonometry and statistics to solve the same problem as the complete linear system method. For example, in the simple method, rotation of an optical axis of the camera 210 relative to the object space may be estimated using an average slope of hypothetical lines between groups 282 corresponding to pairs of buoys 214. Knowing the optical axis rotation of the camera 210 relative to the object space may enable the pose estimation module 226 to correct incoming image coordinates for vanishing coordinates.

In some embodiments, processes that may be used to analyze the relationship between the camera space and the object space may include iterative processes, such as, for example, posit coplanar processes, which are discussed in more detail in Walker. Posit coplanar processes are also discussed in more detail in Dementhon, Daniel F., and Larry S. Davis. "Model-based object pose in 25 lines of code." International Journal of Computer Vision 15.1-2 (1995): 123-141, and Oberkampf, Denis, Daniel F. DeMenthon, and Larry S. Davis. "Iterative pose estimation using coplanar feature points." Computer Vision and Image Understanding 63.3 (1996): 495-511, the entire disclosures of both of which are hereby incorporated herein by reference. Processes that may be used to analyze the relationship between the camera space and the object space may also include an efficient perspective-n-point (EPnP) pose estimation process, which is discussed in more detail in Walker. The EPnP process is also discussed in more detail in Lepetit, Vincent, Francesc Moreno-Noguer, and Pascal Fua. "Epnp: An accurate o (n) solution to the pnp problem." International Journal of Computer Vision 81.2 (2009): 155-166, the entire disclosure of which is hereby incorporated herein by this reference.

One or more sensors 230 (hereinafter "sensors" 230) operably coupled to the computer 220 may be included to provide additional information about the boat's position and orientation (i.e., pose). The pose estimation module 226 may be configured to use information provided by the sensors 230 instead of, or in addition to, the image-object coordinate correspondences 284 in determining the 3D position and orientation 286 of the boat. For example, the information from the sensors 230 may enable the pose estimation module 226 to improve accuracy, and avoid errors in the 3D position and orientation 286. By way of non-limiting example, the sensors 230 may include motion sensors (e.g., accelerometers, gyroscopes, etc.), global positioning system (GPS) sensors, and other sensors, as will be discussed below.

A multimodal system may be included to adapt to lighting conditions perceived by the camera 210, which often depend on boat direction. This effect may be most observable in sunrise or sunset type lighting conditions when light rays are traveling in a direction that is near parallel to the water surface. Determination of boat direction may be achieved from a global navigation satellite system (GNSS) or some combination of a GNSS and other sensors.

In general, the pose estimation module 226 may determine its position when some or all elements of a known buoy grid are within a viewing frustum of the camera 210. By augmenting the system with some GNSS and/or other sensors, the pose estimation module 226 can be adapted to determine position at times when a buoy grid is not in view. The current GPS position accuracy is about ±1 meter. This means that a GNSS solution may not be appropriate for high precision control tasks. It may, however, be accurate enough for low precision tasks such as guiding the boat to a position and orientation where it is known that the buoy grid will be in view.

A combination of sensors 230, including GPS, may be used to tell the computer 220 when to dedicate more processing power to specified tasks. For example, when the boat is positioned and oriented in a place where it is known that the buoy grid is not in view of the camera 210, more power may be dedicated to fusing GPS and inertial measurement unit (IMU) data for higher precision pose estimation. When the boat is oriented and positioned in a place where it is known that the buoy grid is in camera view, more computational power may be dedicated to the visual processes (e.g., the segmentation module 222 and the model fitting module 224).

This feature may also be used in terms of updating a background model used by the segmentation module 222. When the computer 220 is aware that the boat is traveling into the buoy grid, it may allow background model updating functions to be executed. When it is known that the camera 210 is viewing non-course scenes, the system may limit background model updating. This feature may be included so that the system does not destroy the background model by updating it with irrelevant data.

The model fitting module 224 may also be further adapted. For example, the static runtime pose parameters of the camera 210 may be known (e.g., height above water, pitch, and roll). The computer 220 may use GNSS and/or other sensors to estimate other parameters (e.g., lateral displacement and down course position). With all six extrinsic camera parameters known, the system 200 could estimate where, in a captured frame 212, the buoys 214 are expected to be. This information could improve the robustness of the model fitting module 224.

In some embodiments, the system 200 may fuse position, velocity, acceleration, direction, or any derived data from the sensors 230 (e.g., a GNSS, an accelerometer, a gyroscope, a digital compass, other sensors 230 and combinations thereof) with the current pose information to produce more accurate/precise position and orientation estimates. As a non-limiting example, this estimation may be accomplished with a kinematic model of vehicle dynamics and signal filters.

A GNSS data input and other sensor data input could also be used for safety considerations. The operator could mark areas in the lake as either hazardous or non-hazardous. An example of a hazardous position on the lake would be the shoreline, jump ramps, or shallow areas within the lake. In the case that the boat was under the system's (autonomous) control, the GNSS data would serve as a redundant sensor. If it is desired to drive the boat to a shoreline responsive to detecting a catastrophic failure to the visual portion of the system 200, then a check on GNSS and/or other sensor data may trigger errors and alarms. In the case that a human was driving the boat, the GPS and other sensor data may be used to alert the operator that (s)he is entering/exiting a hazardous area of the lake, or entering/exiting a known safe area of the lake.

In some embodiments, the sensors 230 may include a rope direction and force sensor, which may be attached to the boat pylon. This sensor may be used to sense the magnitude and direction of a force applied to the pylon through the towline. In other words, the sensor may indicate (1) the current rope angle with respect to the boat, and (2) how much force is being applied to the rope. Information from this sensor may be fused with other sensor and camera information into the overall kinematic model of the vehicle. If the computer 220 is aware that a force is being applied to the boat, and the computer 220 is aware of the direction and magnitude of the force, then it may predict vehicle motion, and improve the accuracy of the pose estimates. This sensor may detect non-static forces applied to the boat during normal operation. Moreover, in terms of attempting to drive a boat straight through a buoy grid, this sensor may provide information that enables the computer 220 to detect when an external force is applied to the boat. This sensor may allow the system to detect and react to an external force in a quicker manner than through others of the sensors 230.

In some embodiments, the sensors 230 may include acoustic sensors, such as, for example, SONAR. Acoustic sensors may be either water-based for lake depth, air-based, or a combination thereof.

Magnetic Sensors may also be used. Some slalom courses have magnets attached to the buoys for a PERFECT PASS® speed control system. The magnetic sensors may detect these magnets for further sensor input.

Many boats already include a host of sensors such as a tachometer, battery voltage sensor, and speed sensors (e.g., via paddle wheel or pressure, etc.). The system 200 may use some or all of these sensors to augment embodiments of the present disclosure.

Thus, as a non-limiting list, some of the sensors 230 that may be used in embodiments of the present disclosure may include, GPS/GLONASS/GNSS, Accelerometer, Gyroscope, Rope Force/Direction Sensor, Magnetometer/Digital Compass, SONAR, tachometer, and paddle wheel sensors. Additional details for the sensors 230, and additional sensors, are disclosed in Walker.

In some embodiments, the computer 220 may be configured to analyze the 3D position and orientation 286 generated by the pose estimation module 226, and communicate with other devices (e.g., user interfaces 450 of FIG. 4) to provide perceptible feedback 240 to a human driving the boat. The perceptible feedback 240 may include human-perceptible communications configured to provide information to a human driver of the boat to assist the human driver in operating the boat (e.g., steering the boat, accelerating the boat, decelerating the boat, etc.). Non-limiting examples of such perceptible feedback 240 may include audio feedback (e.g., an audio speaker to the left of the human may sound to indicate that the boat should be steered to the left, and an audio speaker to the right of the human may sound to indicate that the boat should be steered to the right), visual feedback (e.g., a light to the left of the human may light up to indicate that the boat should be steered to the left, and a light to the right of the human may light up to indicate that the boat should be steered to the right), and haptic feedback.

In some embodiments, the perceptible feedback 240 may include audio tones, which may be used to inform the operator about the state of the system 200. As a non-limiting example, a low pitch tone may indicate that the visual processes of the system 200 are tracking only a few objects while a high frequency tone may indicate that the system 200 is tracking many objects. The tones may also be used to give driving advice to the user in real-time. For example, beep frequency/tone frequency may indicate the direction and magnitude of lateral displacement from a desired position as the driver is driving. Other tones may give indication of deviations from a desired speed. The system 200 may emit an audible indicator to inform the driver that it is locked/tracking the buoy grid. Audible combinations/tones may be used to convey information to the driver about the system 200. Audio may also be used to indicate when a system failure/error has occurred.

In some embodiments, the perceptible feedback 240 may include visual cues, which may be used as indicators to the driver. As a non-limiting example, flashing lights, or even a readout may be provided after a pass through of the slalom course 100 (FIG. 1). Information could be presented on a monitor or projected onto the boat windshield. As with the audio feedback, different types of visual feedback may be used to give the driver guidance on course corrections in terms of direction and velocity.

In some embodiments, the perceptible feedback 240 may include haptic cues, which may be used as indicators to the driver. As non-limiting examples, haptic feedback such as vibrations through a steering wheel, motion of a driver seat, vibrations of an accelerator, may be used to give the driver guidance on course corrections in terms of direction and velocity as well as other information about the operation of the system 200.

In some embodiments, the perceptible feedback 240 may convey (e.g., visually, audibly, mechanically, etc.) to the driver of the boat information that informs the user how to adjust a map of a buoy grid stored by the computer 220 such that the map of the buoy grid better matches a specification for a course. In some embodiments, the system 200 may inform the driver when it estimates that a buoy is not in the correct position, and give instructions to the driver as to where to move the buoy.

Thus, in some embodiments, the system 200 may be capable of providing perceptible feedback 240 to guide a human driver in operating the boat. In some embodiments, the system 200 may be configured to automate at least a portion of the operating tasks of the human driver in addition to, or instead of, providing the perceptible feedback 240. For example, the system 200 may include a control module 228 configured to receive the 3D position and orientation 286 from the pose estimation module 226, and generate one or more control signals 288 (hereinafter "control signals" 288) configured to control one or more automatic operating devices (e.g., steering devices, speed control devices, other devices, and combinations thereof).

In some embodiments, the pose estimation module 226 may provide 3D position and orientation 286 that is noisy. Thus, the control module 228 may employ filtering (e.g. low-pass-filter, band pass filtering, high-pass filtering, passive filtering, adaptive filtering, etc.) to reduce noise. By way of non-limiting example, a recursive averaging filter may be used to filter the 3D position and orientation 286.

In some embodiments, translation from digital signals to mechanical motion of the boat may be through a stepper motor (e.g., stepper motor 250). In some embodiments, the translation may occur through some other type of device such as a servo or actuator. In some embodiments, the stepper motor 250 (or other digital to mechanical translator) may provide feedback to the computer 220 that indicates step (or other motion) position. In some embodiments, position sensors may be configured to detect the step position, and provide feedback to the computer 220 that indicates the step position. In this way, the computer 220 may be capable of tracking the state of the automatic operating devices to enhance control of the control module 228 over the automatic operating devices. In some embodiments, a human driver of the boat may be provided with a manual override to the stepper motor 250 (or other digital to mechanical translator), as a safety and convenience feature.

In some embodiments, the automatic operating devices may include an automatically controllable rudder 270 configured to automatically adjust steering of the boat responsive to the control signals 288. The automatic operating devices may also include a stepper motor 250 operably coupled to the rudder 270 through a steering cable 260, and configured to adjust the rudder 270 by exerting torque on the steering cable 260. In some embodiments, the stepper motor 250 may be rigidly attached to the boat's steering system (e.g., there would not normally be any "slippage"). The stepper motor 250 may be configured to receive the control signals 288 and adjust the rudder 270 as instructed by the control signals 288. In such embodiments, the control module 228 may be configured to provide commands configured to control the stepper motor 250 (and by extension, the rudder 270) in the control signals 288. In this way, the computer 220 may be configured to automatically make course corrections without user input, or in addition to user input.

In some embodiments, the automatic operating devices may include a jet-ski type nozzle propulsion system, or some other related propulsion technology. In such embodiments, the control module 228 may be configured to provide control signals 288 capable of controlling such propulsion systems.

In summary, the computer 220 may be configured to determine position and orientation information of the boat from frames 212 captured by the camera 210, and issue commands (i.e., perceptible feedback 240, control signals 288 for controlling automatic operating devices, or a combination thereof) designed to keep the boat on a desired path. By way of non-limiting example, the commands may be directed to point the boat to a position about ten (10) meters ahead of the boat on the desired path.

In some embodiments, the system 200 may be fully integrated to include steering control, speed control, steering statistics reports, speed statistics reports, and wireless communication with other machines, other boats, shoreline equipment, etc.

In some embodiments, the control module 228 may also take into consideration data received from the sensors 230 in controlling the automatic operating devices. By way of non-limiting example, data from a GPS sensor may provide positional information of the boat to within about one (1) meter of accuracy, and refresh at a frequency of about four (4) Hertz (Hz) to one (1) Hz. By contrast, the system 200 may be capable of providing 3D position and orientation 286 including positional and orientation information of the boat with an accuracy in the centimeter range, and at a refresh rate of about 30 Hz or more, depending on the processing power of the computer 220 and operating conditions. Although the precision and speed of the positional information from the 3D position and orientation 286 may be faster and more detailed than positional information from GPS sensor data, GPS sensor data may be relied upon for automatic control in instances where the segmentation module 222, the model fitting module 224, the pose estimation module 226, or combinations thereof, are not functioning (e.g., when operating in a course for which the computer 220 does not have background information and course map information), produces erroneous data, or malfunctions.

In some embodiments, the system 200 may be adapted for use with jump courses and trick courses. The same features used for slalom courses 100 can be used in jump courses and trick courses (e.g., the computer 220 may be configured for use with a jump course, a trick course, etc., by identifying jump ramps, rails, other equipment, or combinations thereof).

In some embodiments, user input from the driver of the boat (e.g., received through the user interfaces 450 of FIG. 4) may be accepted to initialize setup parameters for the course, as well as setup parameters that may affect analysis (e.g., setting skier weight, a control style such as, for example, aggressive response or soft response).

In some embodiments, the system 200 may be used to track and provide perceptible feedback 240 and/or control signals 288 for movement of objects other than boats and other water vehicles. By way of non-limiting, the system 200 may be capable of tracking and providing perceptible feedback 240 and/or control signals for movement of automobiles, a person running (e.g., through a course), or any other moving object.

Figure 4:
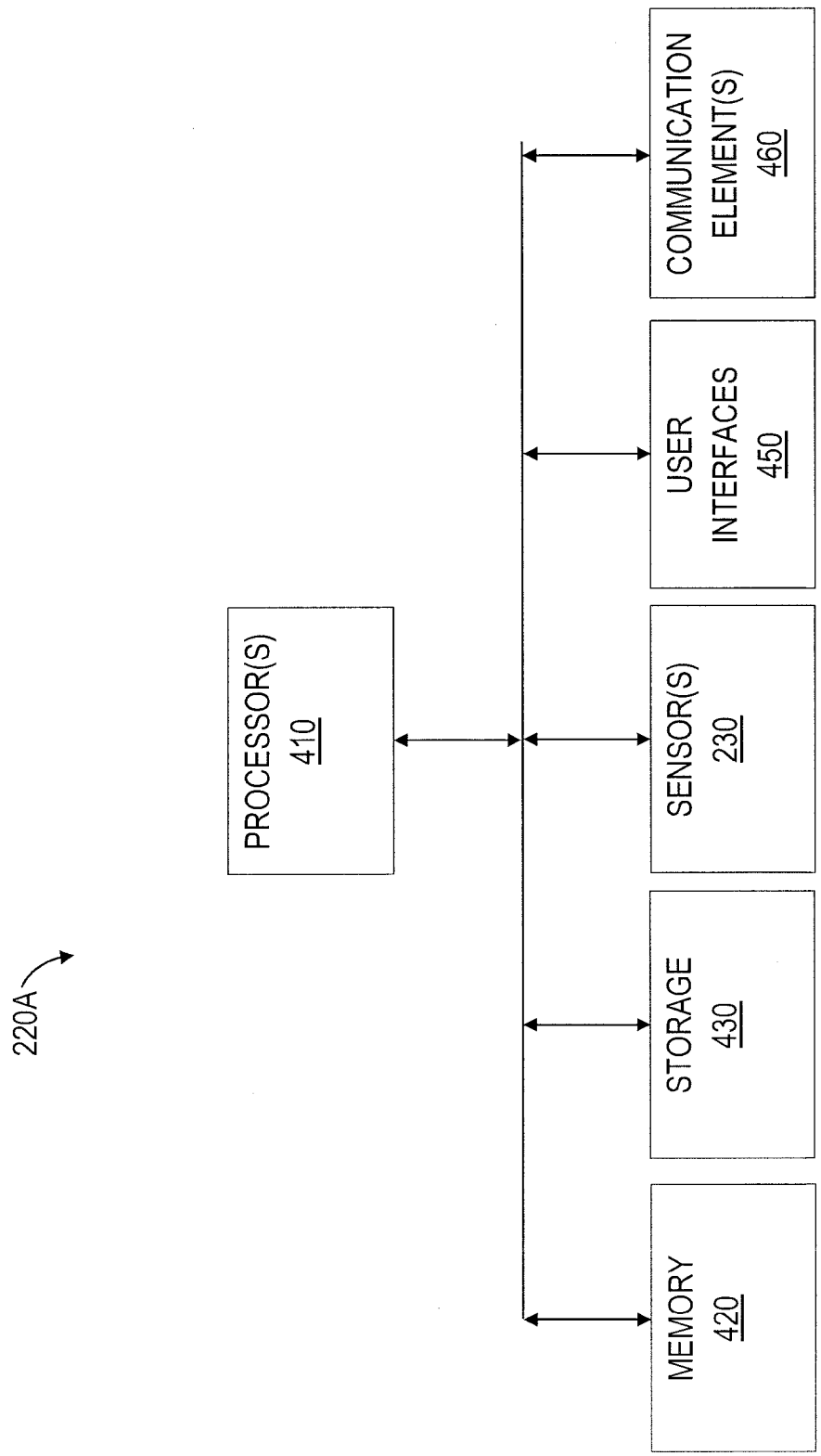
FIG. 4 illustrates a computing system for practicing embodiments of the present disclosure.

FIG. 4 illustrates an example computer 220A of the computer 220 of FIG. 2. The computer 220A may be used for practicing embodiments of the present disclosure. The computer 220A may be a user-type computer, a file server, a computer server, or other similar computer. Computer, computing system, and server may be used interchangeably herein to indicate a system for practicing embodiments of the present disclosure. The computer 220A may be configured for executing software programs containing computing instructions and may include some or all of the elements including one or more processors 410, memory 420, storage 430, sensors 230, user interfaces 450, and one or more communication elements 460.

As non-limiting examples, the computer 220A may be a user-type computer, a file server, a computer server, a notebook computer, a tablet, a handheld device, a mobile device, or other similar computer system for executing software.

The one or more processors 410 may be configured for executing a wide variety of operating systems and applications including the computing instructions for carrying out embodiments of the present disclosure. By way of non-limiting example, the computing instructions may be configured to instruct the processors 410 to execute at least some of the functions previously discussed with reference to at least one of the segmentation module 222, the model fitting module 224, the pose estimation module 226, and the control module 228.

The memory 420 may be used to hold computing instructions, data, and other information for performing a wide variety of tasks including performing embodiments of the present disclosure. By way of example, and not limitation, the memory 420 may include Synchronous Random Access Memory (SRAM), Dynamic RAM (DRAM), Read-Only Memory (ROM), Flash memory, and the like.

Information (e.g., the perceptible feedback 240 of FIG. 2) related to the computer 220A may be presented to, and received from, a user (e.g., the driver of the boat) with one or more user interface elements 450. As non-limiting examples, the user interface elements 450 may include elements such as displays, keyboards, mice, joysticks, haptic devices, microphones, speakers, cameras, touchscreens and lights. The computer 220A may be configured to present a graphical user interface (GUI) with information about the embodiments of the present disclosure on an electronic display. The user interface elements 450 may be configured to present the perceptible feedback 240 (FIG. 2) to the driver of the boat. Additional details for the user interface elements 450 are disclosed in Walker.

The communication elements 460 may be configured for communicating with other devices or communication networks. As non-limiting examples, the communication elements 460 may include elements for communicating on wired and wireless communication media, such as, for example, serial ports, parallel ports, Ethernet connections, Universal Serial Bus (USB) connections IEEE 1394 ("Firewire") connections, BLUETOOTH® wireless connections, 802.1 a/b/g/n type wireless connections, cellular connections, and other suitable communication interfaces and protocols.

The storage 430 may be used for storing relatively large amounts of non-volatile information for use in the computer 220A, and may be configured as one or more storage devices. By way of example, and not limitation, these storage devices may include computer-readable media (CRM). This CRM may include, but is not limited to, magnetic and optical storage devices such as disk drives, magnetic tapes, CDs (compact discs), DVDs (digital versatile discs or digital video discs), and other equivalent storage devices.

Software processes illustrated herein are intended to illustrate representative processes that may be performed by the systems illustrated herein. Unless specified otherwise, the order in which the process acts are described is not intended to be construed as a limitation, and acts described as occurring sequentially may occur in a different sequence, or in one or more parallel process streams. Furthermore, the processes may be implemented in any suitable hardware, software, firmware, or combinations thereof.

When executed as firmware or software, the instructions for performing the processes may be stored on a computer-readable medium. A computer-readable medium includes, but is not limited to, magnetic and optical storage devices such as disk drives, magnetic tape, CDs (compact discs), DVDs (digital versatile discs or digital video discs), and semiconductor devices such as RAM, DRAM, ROM, EPROM, and Flash memory.

By way of non-limiting example, computing instructions for performing the processes may be stored on the storage 430, transferred to the memory 420 for execution, and executed by the processors 410. The processors 410, when executing computing instructions configured for performing the processes, constitute structure for performing the processes and can be considered a special-purpose computer that enhances the function of the computer 220A when so configured. In addition, some or all portions of the processes may be performed by hardware specifically configured for carrying out the processes.

Figure 5A:
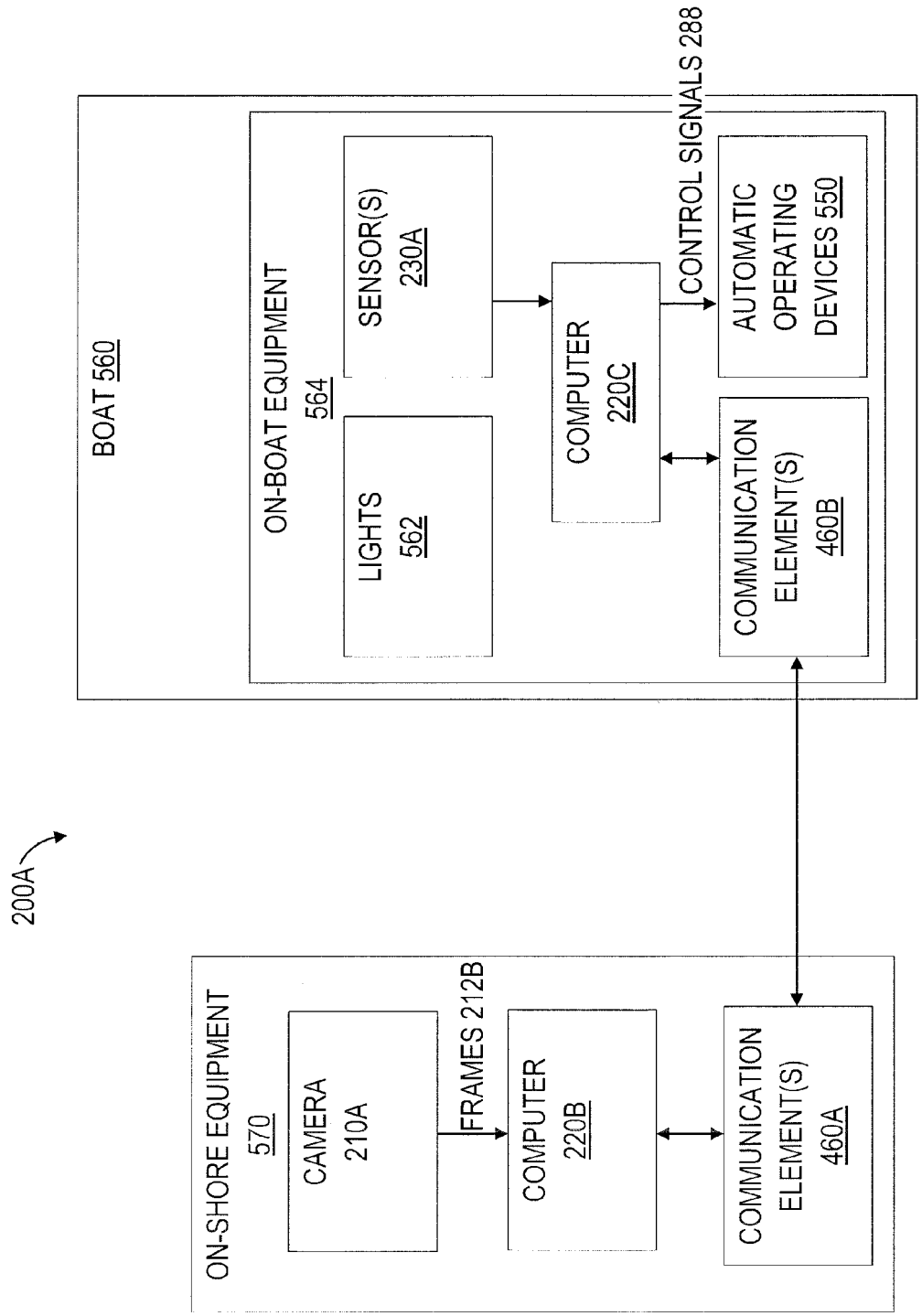
FIG. 5A is a simplified block diagram of a non-limiting example of the system of FIG. 2.

FIG. 5A is a simplified block diagram of a non-limiting example system 200A of the system 200 of FIG. 2. The example system 200A may include various components distributed between on-shore equipment 570 located on a shore 580 (FIG. 5B) and on-boat equipment 564 located on a boat 560. FIG. 5B is a simplified view of a slalom course 500 the boat 560 is configured to navigate through, which is located in water 590 proximate to the shore 580. Referring to FIGS. 5A and 5B together, the on-shore equipment 570 may include a computer 220B operably coupled to at least one camera 210A and communication elements 460A (e.g., a wireless router) configured to communicate with communication elements 460B of the on-boat equipment 564. Also, the on-boat equipment 564 may include a computer 220C operably coupled to the communication elements 460B, sensors 230A, and one or more automatic operating devices 550 (e.g., the stepper motor 250 operably coupled to the rudder 270 by the steering cable 260, an acceleration control device, etc.). The on-boat equipment 564 may further include lights 562 that may be visible to the camera 210A to enable detection of at least one of a position and an orientation of the boat 560 within frames 212B captured by the camera 210A.

The camera 210A may be configured to capture and provide frames 212B to the computer 220B. The computer 220B may be configured to communicate with the computer 220C of the on-boat equipment 564, which together may be configured to perform the processes (e.g., processes associated with the segmentation module 222, the model fitting module 224, the pose estimation module 226, and the control module 228) discussed above with reference to the computer 220 of FIG. 2. In other words, the processes discussed above with reference to FIG. 2 may be distributed between computer 220B of the on-shore equipment 570 and computer 220C of the on-boat equipment 564.

As a specific, non-limiting example, the computer 220B of the on-shore equipment 570 may identify at least one of a position and an orientation of the lights 562 on the boat 560 within the frames 212B captured by the camera 210A (e.g., using the segmentation module 222 and the model fitting module 224). The computer 220B may transmit this information (e.g., included in the image-object coordinate correspondences 284 of FIG. 2) to the computer 220C of the on-boat equipment 564 through the communication elements 460A, 460B. The computer 220C may use the image-object coordinate correspondences 284, together with sensor data from the sensors 230A (e.g., data from a GSNN, accelerometer, digital compass, gyroscope, other sensors, and combinations thereof) to estimate at least one of a position and an orientation of the boat 560 (e.g., using the pose estimation module 226 to generate the 3D position and orientation 286) within the slalom course 500. The computer 220C may use the 3D position and orientation 286 to generate control signals 288 (FIG. 2) for automatically controlling the boat 560 (e.g., using the control module 228 of FIG. 2). The computer 220C may transmit the command signals 288 to the automatic operation devices 550 to automatically control at least one of steering and acceleration of the boat 560.

It is also contemplated that the distribution of the processing acts may be different from that disclosed in the preceding example. By way of non-limiting example, the computer 220B may perform the functions of the pose estimation module 226, the control module 228, and a combination thereof, and transmit at least one of the 3D position and orientation 286 and the control signals 288 to the computer 220C. Also, by way of non-limiting example, the computer 220B may relay the frames 212B to the computer 220C, and the computer 220C may perform the operations of the segmentation module 222, the model fitting module 224, the pose estimation module 226, and the control module 228. Any other distributions of the functions of the computer 220 of FIG. 2 among the computer 220B and the computer 220C are also contemplated (including partial distributions of the processing acts of any of the modules 222, 224, 226, and 228 between the computer 220B and the computer 220C).

In some embodiments, the camera 210A may be stationary to reduce (e.g., eliminate) changes to a background of the frames 212B (to simplify background subtraction processes performed by the segmentation module 222). The computer 220B of the on-shore equipment 570 may be configured to calibrate the camera 210A to determine a position and orientation of the camera 210A relative to the slalom course 500. The calibration may be performed using manual calibration processes, automatic calibration processes, and combinations thereof. By way of non-limiting example, a calibration frame may be captured by the camera 210A, and a user (e.g., the driver of the boat, an on-shore technician, etc.) may manually label (e.g., using the user interfaces 450 of FIG. 4) areas of the calibration frame corresponding to pixels representing known objects (e.g., slalom course guide buoys 530) in the slalom course 500. The computer 220B may use a non-linear least squares optimization process (e.g., Levenberg-Marquardt) to compare the locations of the areas of the calibration frame corresponding to the known objects to the known locations of the known objects to determine the position and orientation of the camera 210A relative to the slalom course 500. Also by way of non-limiting example, automatic labeling of the areas of the pixels representing known objects may be performed by the computer 220B using processes similar to those discussed with reference to the segmentation module 222 and the model fitting module 224.

Once the camera 210A is calibrated, the system 200A may be prepared to track the boat 560 through the slalom course 500 by identifying groups of pixels in the frames 212B that may correspond to the lights 562, determining which of the groups of pixels correspond to the lights 562, and estimating a position and orientation of the boat 560 within the slalom course 500.

In some embodiments, the lights 562 may be configured to emit electromagnetic radiation in certain specific frequencies (e.g., corresponding to colors, infrared, ultraviolet, etc.), and the computer 220B may execute the segmentation module 222 to identify groups of pixels that appear to correlate with the frequencies of the lights 562. By way of non-limiting example, the lights 562 may include three red lights (e.g., similar to brake lights in an automobile) arranged in a particular pattern, and the segmentation module 222 may be configured to produce a map 290 (FIG. 3B) of groups 282 (FIG. 3B) of pixels corresponding to red objects from the frames 212B. In this example, red pixels may be identified by comparing the red, blue, and green 8-bit channels of raw input images. For example, a pixel may be marked as a red pixel (i.e., possibly corresponding to the lights 562) if a ratio of the red channel signal to a sum of the blue and green channel signals is greater than a predetermined threshold (e.g., about 0.8). The segmentation module 222 may then provide the groups 282 including data corresponding to the map 290 to the model fitting module 224.

The model fitting module 224 may be configured to identify which of the groups 282 correspond to the lights 562 on the boat 560. The groups 282 identified by the segmentation module 222 should represent only the lights 562 in the frames 212B. In practice, however, other groups 282 may sometimes be identified that correspond to objects from the frames 212B that are not the lights 562. For example, if some of the buoys 530 are of a similar color to the lights 562, groups 282 corresponding to some of the buoys 530 may be identified by the segmentation module 222. Also, groups 282 corresponding to reflections of the lights 562 from the water 590 may, in some instances, be identified by the segmentation module 222. Accordingly, the model fitting module 224 may be configured to determine which of the groups 282 correspond to the lights 562.

In some embodiments, the model fitting module 224 may be configured to identify permutations of the groups 282 that may possibly correspond to the lights 562 (e.g., using constraining functions). By way of non-limiting example, if the lights 562 are arranged in a linear pattern, the possible permutations of the groups 282 that may correspond to the lights 562 may only include groups 282 that are linearly aligned in the map 290. The model fitting module 224 may remove impossible permutation of the groups 282 from consideration for correlation with the lights 562. The model fitting module 224 may then use scoring functions to score the remaining possible permutations of the groups 282 for correlation with the lights 562. The model fitting module 224 may then select the permutation of the groups 282 having the best score (e.g., the highest weighted sum of the scores from the scoring functions) to correlate with the lights 562. The model fitting module 224 may be configured to provide the image-object coordinate correspondences 284 indicating information (e.g., image coordinates of the pixels corresponding thereto) regarding the permutation of the groups 282 that is determined to correlate with the lights 562 to the pose estimation module 226.

The pose estimation module 226 may be configured to use the position and orientation information of the camera 210A (hereinafter "pose information of the camera 210A") identified by calibrating the camera 210A, and the image-object coordinate correspondences 284 from the model fitting module 224 to estimate position and orientation of the lights 562 with respect to the slalom course 500.

By way of non-limiting example, the estimation module 226 may be configured to create an image vector including image coordinates of the groups 282 determined to correspond to the lights 562 (e.g., from the image-object coordinate correspondences 284) and a known focal length of the camera 210A (e.g., from the pose information of the camera 210A). The estimation module 226 may then normalize the image vector such that the image coordinates and the known focal length are translated into a world coordinate system instead of the camera coordinate system. The estimation module 226 may then intersect the normalized image vector with a world space plane at a known down course distance of the boat 560 to determine the position and orientation information of the boat 560. The down course position of the boat 560 may be estimated by comparing a current GPS position of the boat to GPS positions of the buoys 530 in the slalom course 500.

The pose estimation module 226 may be configured to generate the 3D position and orientation 286 including information regarding the position and orientation of the lights 562 with respect to the slalom course 500. The 3D position and orientation 286 may be transmitted to the computer 220C by computer 220B through the communication elements 460A, 460B. The computer 220C may receive the 3D position and orientation 286 by monitoring a predefined port for data packets (e.g., user datagram protocol (UDP) packets). The computer 220C may parse the data packets corresponding to the 3D position and orientation 286. In some embodiments, the computer 220C may fuse readings from the sensors 230A through a dynamic model of the boat 560 to produce more precise and less noisy position and orientation estimates of the position and orientation of the boat 560.

The position and orientation estimate (e.g., the 3D position and orientation 286) of the boat 560 may be processed by the control module 228. The control module 228 may then examine the current position and orientation of the boat 560, and determine what control commands will set the boat 560 on a desired path 510 through the slalom course 500 (e.g., set the boat 560 on a path toward a point 10 meters ahead on the desired path 510). The control commands may be transmitted to the automatic operating devices 550 in the control signals 288, and at least partial automatic control of the boat 560 may be provided thereby. By way of non-limiting example, the control commands may be interpreted by a mechanical actuator and force/motion may be applied to the boat's steering system, acceleration system, or combinations thereof. In addition, or instead of the automatic operating devices 550, the control commands may be transmitted to a user interface 450 (FIG. 4), and presented to a driver of the boat. The driver may then manually make the control adjustments indicated by the control commands.

Although specific embodiments discussed herein are discussed in terms of an environment of a boat tracking through a slalom course, embodiments of the disclosure may also be used to track and at least automatically control objects in other environments. For example, embodiments of the disclosure may be used to at least partially control water vehicles in a fishing environment, in which driver attention may sometimes be distracted from driving by fish action and other distractions. Also, embodiments of the disclosure may be used to at least partially control automobiles (e.g., by tracking position of an automobile relative to other automobiles, center lines, and lane lines on roads, etc.) in collision prevention systems, and general automatic car driving systems. Aerospace embodiments are also contemplated.

The use of lights (e.g., the lights 562) in tracked objects (e.g., boats 560, buoys 530, etc.) may be helpful for operation in low image contrast environments (e.g., night operation, operation with cheap cameras that introduce noise into the images, etc.). Also, in embodiments where lights (e.g., headlights, brake lights) of a vehicle are tracked, failures may still occur if those lights do not properly function (e.g., a tail light of a car may be burned out), or if background lights and reflections confound the computer 220 (e.g., the segmentation module 222, scoring functions of the model fitting module 224, etc.). If proper image contrast cannot be sustained, it may be difficult (e.g., impossible) to accurately determine positions of vehicles, and provide meaningful control feedback to vehicle navigation (e.g., automatic or manual navigation).

As previously discussed, the color of lights may be selected to improve contrast against known backgrounds. For example, if a car including the system 200 will be tracking its position relative to other cars in red-rock country, it may increase contrast of the other cars in image frames 212 captured by the system 200 if green lights are used by the other cars. In some conditions, however, background objects may periodically be close to the same color as the lights, and the system may fail. In the example of the car driving through red-rock country, if the car drives through a grove of green trees, the system 200 may fail to distinguish the green lights on the other cars from the background, or fail to correctly identify the green lights.

Methods that may be used to improve image contrast may include controlling lighting of the environment (e.g., using a flash with the camera, etc.), and controlling the lights on tracked objects (e.g., flashing the lights, changing the colors of the lights, changing brightness of the lights, etc.). Controlling the lights may be beneficial over controlling the environmental lighting because control over environmental lighting may be difficult or impossible, because it may be known what color to search for in an image by controlling light color, and because objects at long distances may still be tracked when they would be out of range of a flash of the camera.

In some embodiments, lights on tracked objects may be configured to blink on and off in predetermined patterns. By way of non-limiting example, the lights may be configured to simply turn on for a predetermined time, and then turn off for another predetermined time. Also by way of non-limiting example, a pseudo random number generator having a seed known by both a controller controlling the lights and the computer 220 of the system 200 may be used to control on and off flashings of the lights. The computer 220 may be configured to recognize the on and off pattern, which may help to distinguish the lights from other objects.

In some embodiments, lights on tracked objects may be configured to change in color over time (e.g., relatively rapidly, cyclically, other changes, or combinations thereof). The lights would, consequentially, emit light that is different from colors (resulting in relatively better image contrast) of the background at least for part of the time. The system 200 may then track the lights during those times of relatively better image contrast.

As a specific, non-limiting example, the system 200 may be used to at least partially automate control of a car for a collision prevention system. Other cars may be equipped with controllable lights on the back bumper of other cars. The controllable lights on the other cars may be operably coupled to a controller (e.g., a processing element operably coupled to a computer readable medium including computer-readable instructions configured to instruct the processing element to control the lights) configured to control at least one of color, brightness, and flashing (e.g., on and off) of the lights.

In some embodiments, the system 200 (e.g., the computer 220) may be configured to communicate (e.g., through the communication elements 450 of FIG. 4) with the controllers controlling the lights on the tracked objects. In such embodiments, the computer 220 may instruct the controllers to adjust the lights (e.g., flashing the lights on and off, changing the color of the lights, changing the intensity of the lights, etc.) if not enough image contrast provided in the frames 212.

While the disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated herein.

What is claimed is:

1. A method of controlling water vehicle position and movement, comprising:

capturing, with one or more cameras secured to the water vehicle, video frame data corresponding to video image frames taken of at least a portion of a water course;

identifying, with a computer, groups of pixels from the video frame data, the identified groups of pixels determined to correspond to objects in the water course;

correlating at least a pair of the identified groups of pixels with a known pair of buoys on each side of in the water course;

estimating at least one of a position or an orientation of the water vehicle within the water course by analyzing positions of the groups of pixels within the video image frames and known spatial positions of the one or more cameras that captured the video frame data and the known pair of buoys in the water course;

estimating at least one of steering parameters and acceleration parameters that are determined to navigate the water vehicle on a desired path through the water course; and transmitting, with the computer, navigation data including the at least one of the steering parameters and the acceleration parameters to at least one of:
   a user interface configured to provide the at least one of the steering parameters and the acceleration parameters to a driver of the water vehicle; or
   an automatic operating device configured to receive the navigation data and automatically adjust at least one of steering and acceleration of the water vehicle according to the at least one of the steering parameters and the acceleration parameters.

2. The method of claim 1, wherein estimating at least one of a position or an orientation of a water vehicle further comprises analyzing sensor data from one or more sensors to determine the at least one of the position or the orientation of the water vehicle.

3. The method of claim 1, wherein correlating at least a pair of the identified groups of pixels with a known pair of buoys in the water course comprises:
   assigning a score to a plurality of pairs of the group of pixels of the identified groups of pixels for its fitness for correlation with each known pair of buoys; and
   correlating a different pair of the identified group of pixels with each known pair of buoys having a best score for the correlated known pair of buoys assigned thereto.

4. The method of claim 1, wherein correlating at least a pair of the identified groups of pixels with a known pair of buoys in the water course comprises assigning a different pair of groups of pixels to each of a plurality of known pairs of buoys in the water course.

5. The method of claim 1, wherein correlating at least a pair of the identified groups of pixels with a known pair of buoys in the water course comprises eliminating at least one identified group of pixels from consideration for correlation with the known pair of buoys if the at least one identified group of pixels has properties that are inconsistent with properties of the known pair of buoys.

6. The method of claim 3, wherein assigning the score to the plurality of pairs of the group of pixels for its fitness for correlation with each known object of at least a portion of the known objects is based, at least in part, on a slope of a line passing through each group of pixels for a given pair to be evaluated for correlation.

7. The method of claim 3, wherein assigning the score to the plurality of pairs of the group of pixels is based, at least in part, on determining a number of pixels within each group of pixels for a given pair to be evaluated for correlation.

8. The method of claim 3, wherein assigning the score to the plurality of pairs of the group of pixels is based, at least in part, on determining that a given pair to be evaluated for correlation is located relatively close to its location in a previous video image frame of the video frame data.

9. The method of claim 3, wherein assigning the score to the plurality of pairs of the group of pixels is based, at least in part, on determining that a given pair to be evaluated for correlation has a pixel width between each of the groups that is wider and located toward a bottom portion of the video image frame in comparison with another pair that has a pixel width between each of the groups of pixels that is narrower and located toward an upper portion of the video image frame.

10. The method of claim 1, wherein identifying groups of pixels determined to correspond to objects in a water course comprises using a background subtraction process to differentiate the groups of pixels determined to correspond to the non-background objects in the water course from background pixels of a dynamic background.

11. The method of claim 10, wherein using a background subtraction process comprises using a visual background extractor (ViBe) process.

12. A system, comprising:
   one or more image capture devices configured to capture video image frame data of a course that a vehicle is to navigate;
   one or more computers configured to receive the video image frame data from the one or more image capture devices, and execute computer-readable instructions including:
      a segmentation software module configured to identify groups of pixels from the video image frame data that correspond to determined objects in the course that are distinguished from dynamically changing background data;
      a model fitting software module configured to group together the identified groups of pixels into one or more pairs, and correlate pairs of known objects on each side of the course with the one or more pairs of the groups of pixels identified by the segmentation software module; and
      a pose estimation software module configured to estimate at least one of a position or orientation of the vehicle by analyzing image locations of the object pairs of groups of pixels within the video image frame data and known locations of at least one of:
         the one or more image capture devices; or
         the pair of known objects correlated with the groups of pixels by the model fitting software module; and
   one or more interface devices operably coupled to the one or more computers and configured to at least partially automate navigation of the vehicle through the course.

13. The system of claim 12, wherein the one or more interface devices configured to at least partially automate navigation of the vehicle through the course include a user interface configured to provide perceptible feedback to a driver of the vehicle, the perceptible feedback configured to provide information instructing the driver of the vehicle to perform at least one manual control of the vehicle selected from the group consisting of steering the vehicle, accelerating the vehicle, and decelerating the vehicle.

14. The system of claim 13, wherein the user interface is configured to provide at least one of visual feedback, audible feedback, and haptic feedback to the driver of the vehicle.

15. The system of claim 12, wherein the one or more interface devices configured to at least partially automate navigation of the vehicle through the course include one or more automatic operating devices operably coupled to the one or more computers, and wherein the one or more computers include a control module configured to control the one or more automatic operating devices.

16. The system of claim 15, wherein the one or more automatic operating devices include a steering element of the vehicle operably coupled to an electrically controlled motor configured to adjust the steering element of the vehicle responsive to control signals received from the control module.

17. A system comprising:
a water vehicle comprising:
an image capture device secured to the water vehicle, the image capture device configured to capture video image frames of at least a portion of a water course;
a computer operably coupled to the image capture device, the computer comprising at least one processing element operably coupled to at least one data storage device including computer-readable instructions stored thereon, the at least one processing element configured to execute the computer-readable instructions, the computer-readable instructions configured to instruct the at least one processing element to:
identify groups of pixels from the video image frames that correspond to determined non-background objects in the water course;
correlate pairs of the identified groups of pixels with known buoy pairs on each side of the water course according to one or more scoring criteria for determining a likelihood of a match between the identified groups of pixels that are grouped together and the known buoy pairs; and
estimate at least one of position or orientation of the water vehicle within the water course by comparing locations, within the video image frames, of the pairs of the identified groups of pixels that correlate with the known buoy pairs in the water course to known locations of the known buoy pairs in the water course; and
a user interface configured to provide human-perceptible feedback to a driver of the water vehicle to indicate corrections to be made to at least one of a position, a direction, and a speed of the water vehicle.

18. A method of controlling water vehicle position and movement, comprising:
capturing, with one or more cameras from a stationary location remote to the water vehicle, video frame data corresponding to video image frames taken of at least a portion of a water course;
identifying, with a computer, groups of pixels from a static background of the video frame data;
determining navigation data including a position of the water vehicle within the water course by analyzing positions of the groups of pixels associated with the moving water vehicle within the video image frames and known additional pairs of groups of pixels identified by the computer that are correlated with known buoy pairs on each side of the water course;
transmitting, with the computer, at least a portion of the navigation data from the computer located at the stationary location to another computer located on-board the water vehicle; and
automatically adjusting at least one of steering or acceleration of the water vehicle responsive to the navigation data received from the computer located at the remote location and orientation data determined by a device located on-board the water vehicle.

19. The method of claim 18, wherein identifying groups of pixels corresponding to an object includes identifying lights mounted to the water vehicle at known locations for the computer to use while determining the navigation data.

20. The method of claim 19, wherein identifying the lights includes distinguishing the lights from other objects corresponding to other groups of pixels within the video frame data by adjusting at least one parameter of the lights including at least one of:
controlling a color of the lights;
controlling a brightness of the lights;
controlling a flashing of the lights according to a predetermined pattern;
controlling a flashing of the lights by turning the lights on and off for a predetermined time; or
controlling a flashing of the lights according to a pseudo random number generator having a seed known by both a controller controlling the lights and the computer.

* * * * *